United States Patent
Nam et al.

(10) Patent No.: US 11,109,312 B2
(45) Date of Patent: Aug. 31, 2021

(54) DYNAMIC GROUP WAKE-UP RECONFIGURATION

(71) Applicant: QUALCOMM Incorporated, San Diego, CA (US)

(72) Inventors: Wooseok Nam, San Diego, CA (US); Tao Luo, San Diego, CA (US); Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/934,467

(22) Filed: Jul. 21, 2020

(65) Prior Publication Data

US 2021/0045056 A1    Feb. 11, 2021

Related U.S. Application Data

(60) Provisional application No. 62/885,051, filed on Aug. 9, 2019.

(51) Int. Cl.
*H04W 52/02* (2009.01)
*H04W 76/28* (2018.01)

(52) U.S. Cl.
CPC ... *H04W 52/0216* (2013.01); *H04W 52/0229* (2013.01); *H04W 76/28* (2018.02)

(58) Field of Classification Search
CPC ............. H04W 52/0216; H04W 76/28; H04W 52/0229
See application file for complete search history.

(56) References Cited

U.S. PATENT DOCUMENTS

| | | | | |
|---|---|---|---|---|
| 9,986,532 | B2* | 5/2018 | Lee | H04W 4/70 |
| 2013/0044661 | A1* | 2/2013 | Jokimies | H04W 52/0274 370/311 |
| 2013/0246835 | A1* | 9/2013 | Mahajan | H04W 52/029 713/503 |
| 2014/0119256 | A1* | 5/2014 | Kim | H04W 52/0216 370/311 |
| 2015/0201375 | A1 | 7/2015 | Vannithamby et al. | |

(Continued)

OTHER PUBLICATIONS

International Search Report and Written Opinion—PCT/US2020/043097—ISA/EPO—dated Oct. 23, 2020.

(Continued)

*Primary Examiner* — Dominic E Rego
(74) *Attorney, Agent, or Firm* — Arent Fox, LLP

(57) ABSTRACT

According to an example, a method of wireless communication comprises receiving a group wake-up signal configuration corresponding to a group of UEs that share a wake-up signal associated with a discontinuous reception operation, wherein the group wake-up signal configuration identifies a set of wake-up parameters for at least one of the wake-up signal or the discontinuous reception operation. The method further includes transmitting a wake-up configuration update triggering message, receiving a group wake-up signal configuration update message including at least one new wake-up parameter, and performing the discontinuous reception operation based on the at least one new wake-up parameter. A corresponding method of wireless communication at a base station is also described.

30 Claims, 11 Drawing Sheets

(56) References Cited

U.S. PATENT DOCUMENTS

| | | | |
|---|---|---|---|
| 2016/0044596 A1* | 2/2016 | Iwai | H04L 5/0048 370/311 |
| 2016/0295504 A1* | 10/2016 | Wang | H04W 72/0473 |
| 2018/0263011 A1* | 9/2018 | Wang | H04W 76/28 |
| 2019/0090191 A1* | 3/2019 | Liu | H04W 28/0215 |
| 2020/0053645 A1* | 2/2020 | Charbit | H04W 68/10 |
| 2020/0314816 A1* | 10/2020 | Yi | H04W 72/042 |

OTHER PUBLICATIONS

Samsung: "UE-group Wake-up Signal for eMTC," 3GPP Draft, 3GPP TSG RAN WG1 Meeting #96bis, R1-1904374, MTC WUS, Xi'an, China, Apr. 8, 2019-Apr. 12, 2019, 3 pages, Retrieved from http://www.3gpp.org/ftp/Meetings%5F3GPP%5FSYNC/RAN1/Docs/R1%2D1904374%2Ezip, retrieved on Apr. 7, 2019.

* cited by examiner

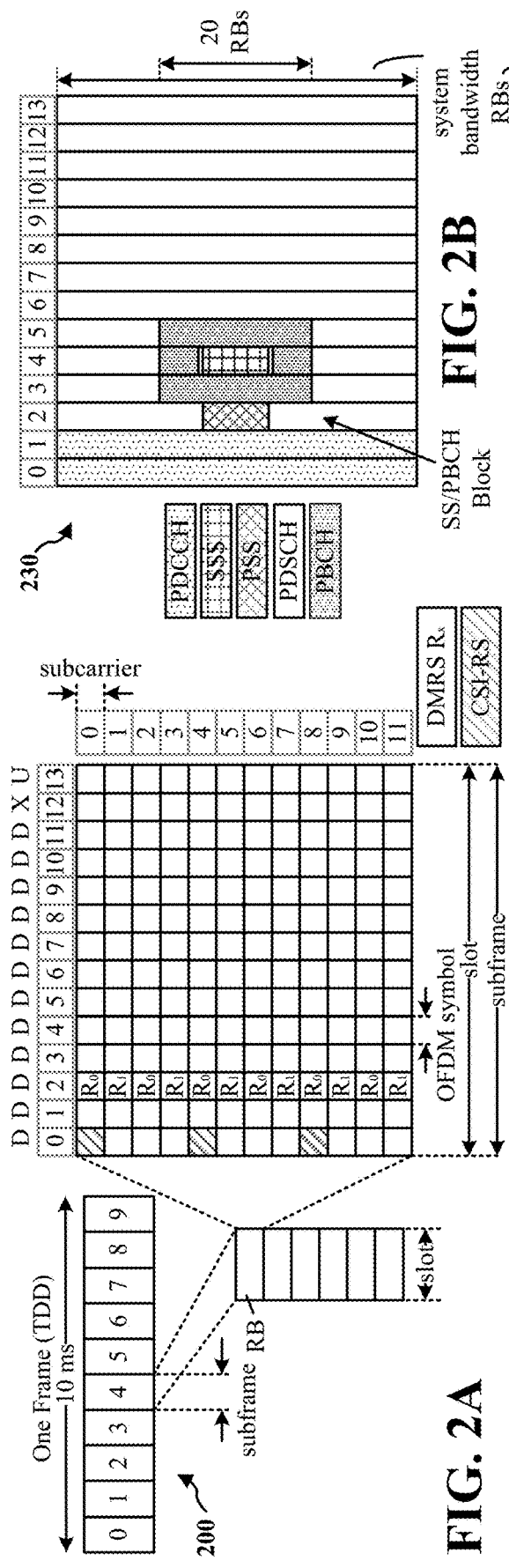
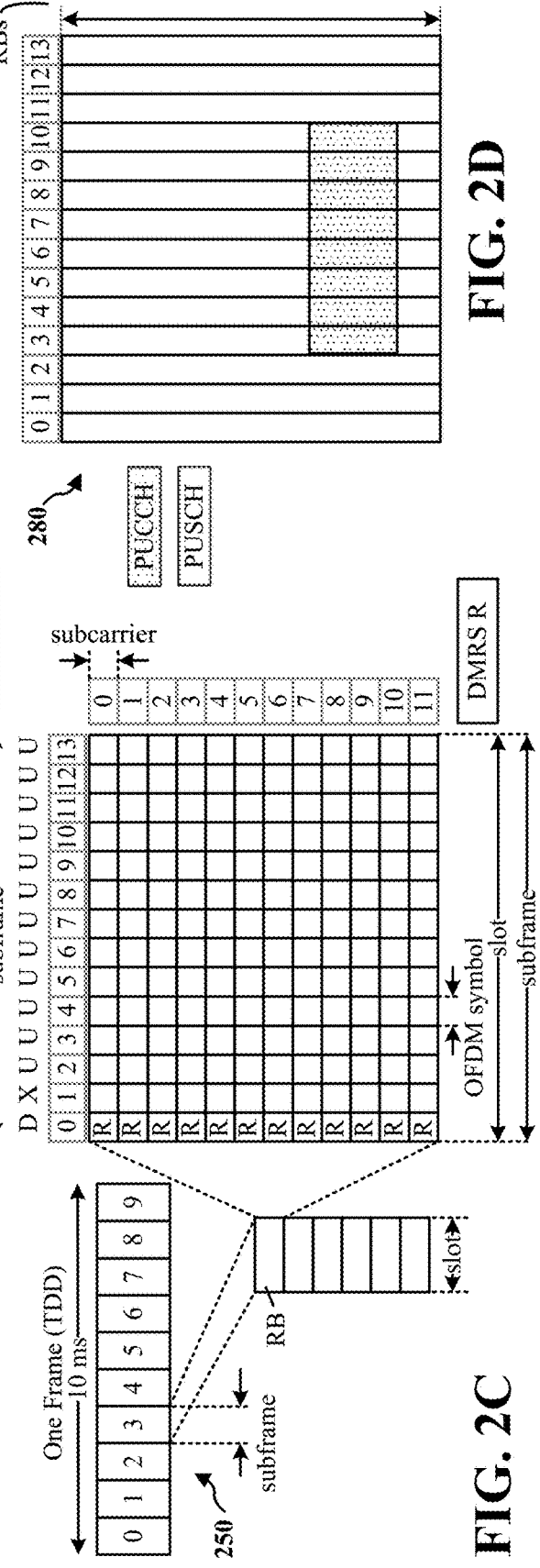
FIG. 2A  FIG. 2B  FIG. 2C  FIG. 2D

DYNAMIC GROUP WAKE-UP RECONFIGURATION

CROSS REFERENCE TO RELATED APPLICATION(S)

This application claims the benefit of U.S. Provisional Application Ser. No. 62/885,051, entitled "DYNAMIC GROUP WAKE-UP RECONFIGURATION" and filed on Aug. 9, 2019, which is expressly incorporated by reference herein in its entirety.

BACKGROUND

The present disclosure relates generally to communication systems, and more particularly, to dynamic group wake-up reconfiguration.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

For example, a user equipment in communication with a wireless communication network via one of the multiple access technologies may desire to conserve power. Thus, improvements in power conservation in wireless communications are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication includes receiving a group wake-up signal configuration corresponding to a group of user equipments (UEs) that share a wake-up signal associated with a discontinuous reception operation, where the group wake-up signal configuration identifies a set of wake-up parameters for at least one of the wake-up signal or the discontinuous reception operation. The method further includes transmitting a wake-up configuration update triggering message, receiving a group wake-up signal configuration update message including at least one new wake-up parameter, and performing the discontinuous reception operation based on the at least one new wake-up parameter.

According to another example, a method of wireless communication at a base station includes transmitting, to a UE, a group wake-up signal configuration corresponding to a group of UEs that share a wake-up signal associated with a discontinuous reception operation of the UE, where the group wake-up signal configuration identifies a set of wake-up parameters for at least one of the wake-up signal or the discontinuous reception operation. The method further includes receiving a wake-up configuration update triggering message, and determining at least one new wake-up parameter in response to the wake-up configuration update triggering message. Also, the method includes transmitting a group wake-up signal configuration update message including at least one new wake-up parameter, and transmitting one or more discontinuous transmissions based on the discontinuous reception operation of the UE based on the at least one new wake-up parameter.

In other aspects, a UE for wireless communication is provided that includes a memory and a processor in communication with the memory. The processor is configured to receive a group wake-up signal configuration corresponding to a group of UEs that share a wake-up signal associated with a discontinuous reception operation, where the group wake-up signal configuration identifies a set of wake-up parameters for at least one of the wake-up signal or the discontinuous reception operation. The processor is further configured to transmit a wake-up configuration update triggering message, receive a group wake-up signal configuration update message including at least one new wake-up parameter, and perform the discontinuous reception operation based on the at least one new wake-up parameter.

In further aspects, a base station for wireless communication is provided that includes a memory and a processor in communication with the memory. The processor is configured to transmit, to a UE, a group wake-up signal configuration corresponding to a group of UEs that share a wake-up signal associated with a discontinuous reception operation of the UE, where the group wake-up signal configuration identifies a set of wake-up parameters for at least one of the wake-up signal or the discontinuous reception operation. The processor is further configured to receive a wake-up configuration update triggering message, and determine at least one new wake-up parameter in response to the wake-up configuration update triggering message. The processor is further configured to transmit a group wake-up signal configuration update message including at least one new wake-up parameter, and transmit one or more discontinuous transmissions based on the discontinuous reception operation of the UE based on the at least one new wake-up parameter.

In other aspects, a UE for wireless communication is provided that includes means for receiving a group wake-up signal configuration corresponding to a group of UEs that share a wake-up signal associated with a discontinuous reception operation, where the group wake-up signal configuration identifies a set of wake-up parameters for at least one of the wake-up signal or the discontinuous reception operation. The UE further includes means for transmitting a wake-up configuration update triggering message, means for receiving a group wake-up signal configuration update message including at least one new wake-up parameter, and means for performing the discontinuous reception operation based on the at least one new wake-up parameter.

According to another example, a base station for wireless communication is provided that includes means for transmitting, to a UE, a group wake-up signal configuration corresponding to a group of UEs that share a wake-up signal associated with a discontinuous reception operation of the UE, where the group wake-up signal configuration identifies a set of wake-up parameters for at least one of the wake-up signal or the discontinuous reception operation. The base station further includes means for receiving a wake-up configuration update triggering message, and means for determining at least one new wake-up parameter in response to the wake-up configuration update triggering message. The base station further includes means for transmitting a group wake-up signal configuration update message including at least one new wake-up parameter, and means for transmitting one or more discontinuous transmissions based on the discontinuous reception operation of the UE based on the at least one new wake-up parameter.

In other aspects, disclosed is a computer-readable medium storing code that, when executed by one or more processors, causes the one or more processors to receive a group wake-up signal configuration corresponding to a group of UEs that share a wake-up signal associated with a discontinuous reception operation, where the group wake-up signal configuration identifies a set of wake-up parameters for at least one of the wake-up signal or the discontinuous reception operation. The code, when executed by the one or more processors, further causes the one or more processors to transmit a wake-up configuration update triggering message, receive a group wake-up signal configuration update message including at least one new wake-up parameter, and perform the discontinuous reception operation based on the at least one new wake-up parameter.

According to another example, disclosed is a computer-readable medium storing code that, when executed by one or more processors, causes the one or more processors to transmit, to a UE, a group wake-up signal configuration corresponding to a group of UEs that share a wake-up signal associated with a discontinuous reception operation of the UE, where the group wake-up signal configuration identifies a set of wake-up parameters for at least one of the wake-up signal or the discontinuous reception operation. The code, when executed by the one or more processors, further causes the one or more processors to receive a wake-up configuration update triggering message, and determine at least one new wake-up parameter in response to the wake-up configuration update triggering message. The code, when executed by the one or more processors, further causes the one or more processors to transmit a group wake-up signal configuration update message including at least one new wake-up parameter, and transmit one or more discontinuous transmissions based on the discontinuous reception operation of the UE based on the at least one new wake-up parameter.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G/NR frame for use in communication by the base stations and/or the UEs in FIG. 1, according to some aspects of the present disclosure.

FIG. 2B is a diagram illustrating an example of DL channels within a 5G/NR subframe for use in communication by the base stations and/or the UEs in FIG. 1, according to some aspects of the present disclosure.

FIG. 2C is a diagram illustrating an example of a second 5G/NR frame for use in communication by the base stations and/or the UEs in FIG. 1, according to some aspects of the present disclosure.

FIG. 2D is a diagram illustrating an example of UL channels within a 5G/NR subframe for use in communication by the base stations and/or the UEs in FIG. 1, according to some aspects of the present disclosure.

DETAILED DESCRIPTION

Figure 1:
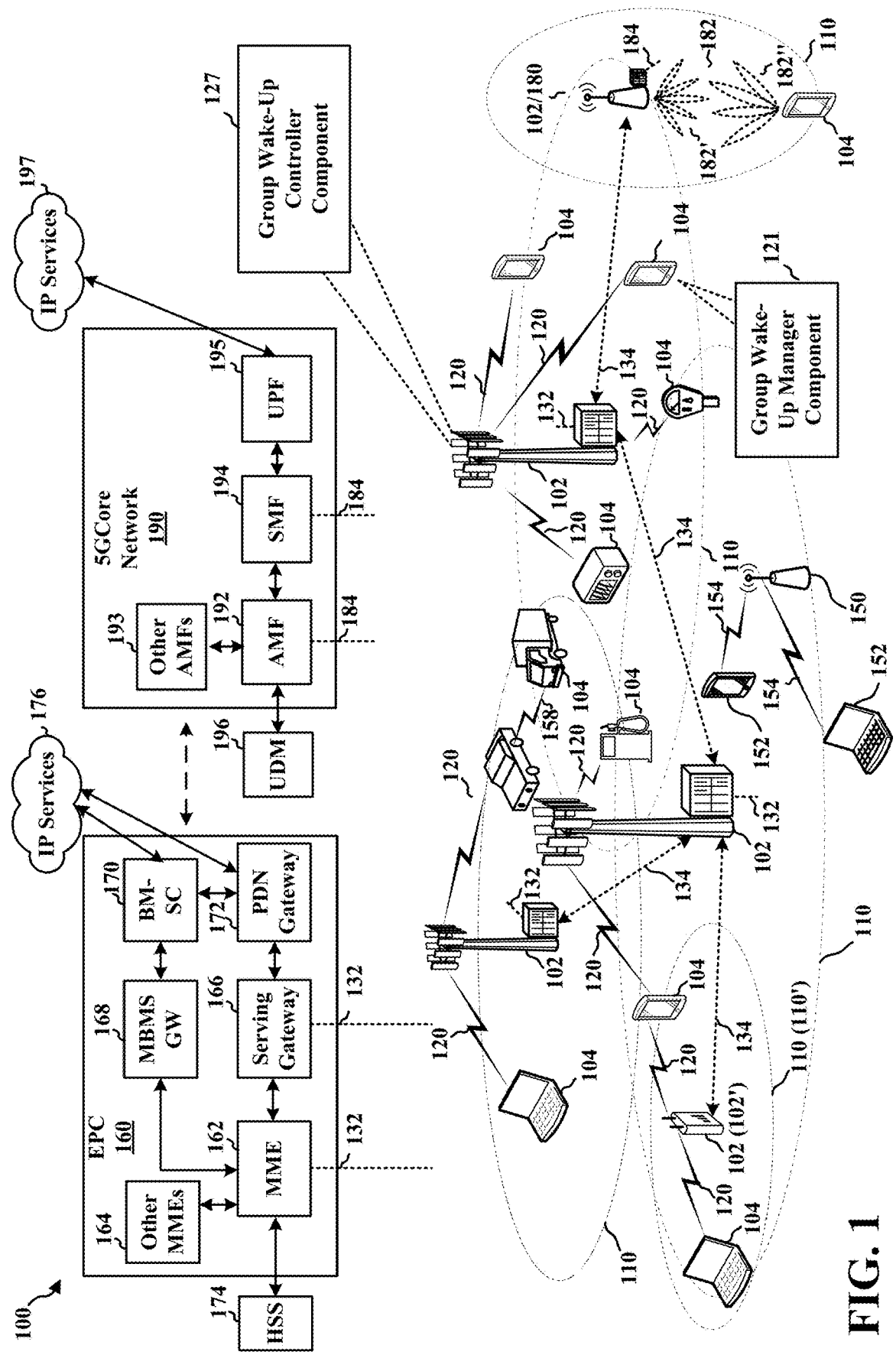
FIG. 1 is a schematic diagram of an example of a wireless communications system and an access network, according to some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present aspects generally relate to dynamic group wake-up reconfiguration. In some cases, a UE may be assigned a group wake-up configuration, which includes a wake-up signal and discontinuous reception operation that is aligned with a group of other UEs having similar configurations. Due to a change in traffic status, operational mode (e.g., connected, idle, inactive), or mobility, the UE may need to have its wake-up configuration changed.

The present disclosure provides apparatus and methods of dynamically reconfiguring the group wake-up configuration of the UE, either to alter wake-up parameters associated with how the UE operates with a current group or to move the UE into a new group. Additionally, the present disclosure enables this dynamic wake-up group reconfiguration using efficient signaling, such as Layer 1 or Layer 2 signaling, as opposed to using Layer 3 or Radio Resource Control (RRC) signaling. Thus, the present disclosure provides an efficient mechanism for dynamically modifying the group wake-up configuration of the UE, which may save both network communication resources and UE processing, communication, and power resources.

These and other features of the present disclosure are discussed in detail below with regard to FIGS. 1-11.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)).

According to the present disclosure, the base station 102 may include a group wake-up controller component 127 that is operable to dynamically reconfigure a group wake-up configuration of the UE 104 in response to signaling from the UE 104. Correspondingly, the UE 104 may include a group wake-up manager component 121 that is operable to transmit signaling to trigger the base station 102 to dynamically reconfigure the group wake-up configuration of the UE 104, as well as to receive a configuration update from the base station 104 and perform the dynamic reconfiguration of the group wake-up configuration of the UE 104.

Further details of the operations performed by the UE 104 and the base station 102 are discussed in more detail below.

The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 132, 134, 184 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158, e.g., including synchronization signals. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring to FIGS. 2A-2D, one or more example frame structures, channels, and resources may be used for communication between the base stations 102 and the UEs 104 of FIG. 1. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (B SR), a power headroom report (PHR), and/or UCI.

Figure 3:
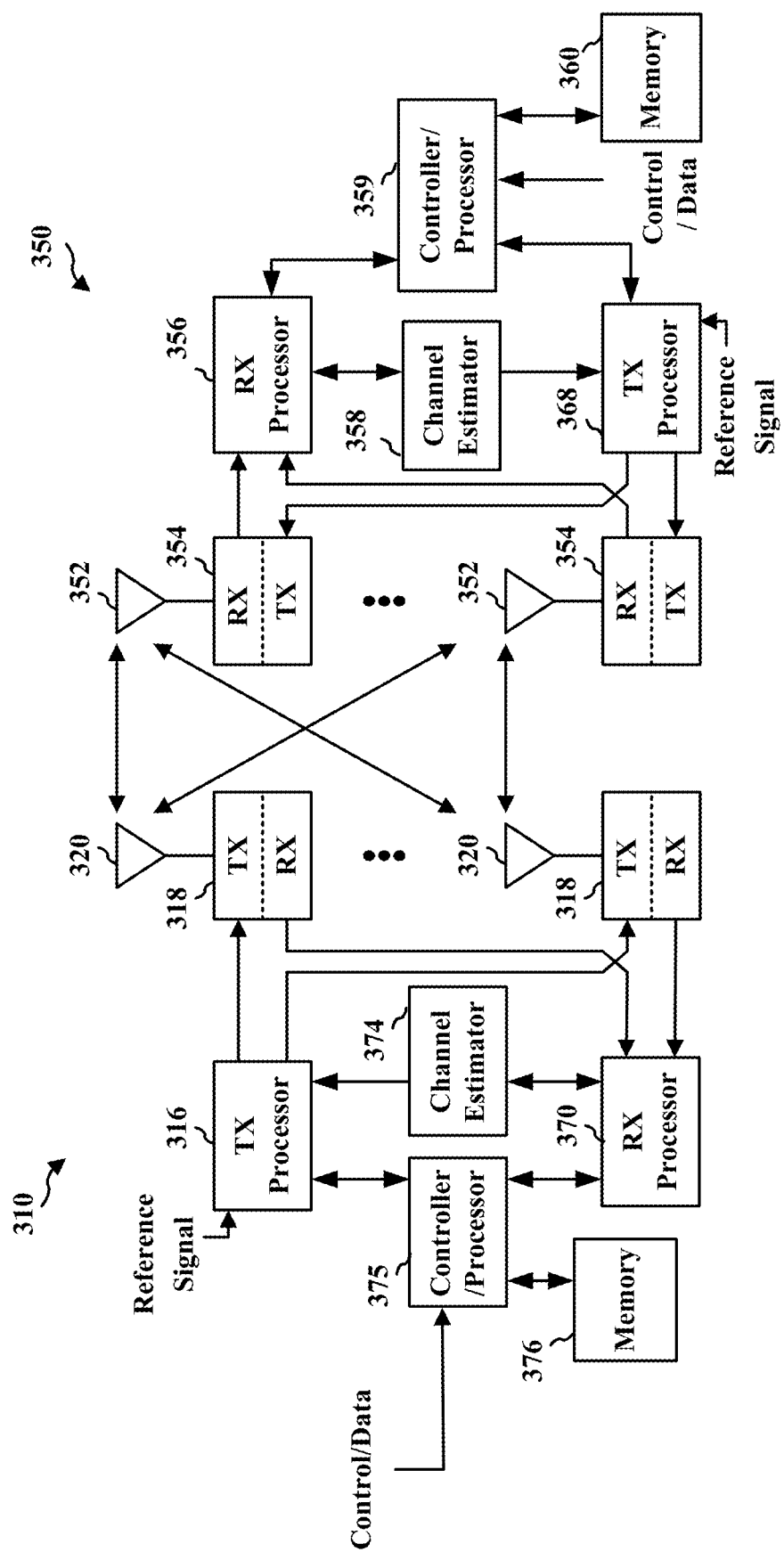
FIG. 3 is a schematic diagram of an example of hardware components of two of the communicating nodes in the system of FIG. 1, according to some aspects of the present disclosure.

FIG. 3 is a diagram of hardware components of example transmitting and/or receiving (tx/rx) nodes 310 and 350. In one specific example, the tx/rx node 310 may be an example implementation of base station 102 and the tx/rx node 350 may be an example implementation of UE 104.

For example, in the DL, IP packets from the EPC 160 or 5G core 190 may be provided to a controller/processor 375 of the tx/rx node 310 (e.g., base station 102). The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the tx/rx node 350. Each spatial stream may then be provided to a different antenna 320 via a separate transmitter 318TX. Each transmitter 318TX may modulate an RF carrier with a respective spatial stream for transmission.

At the tx/rx node 350 (e.g., UE 104), each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the tx/rx node 350. If multiple spatial streams are destined for the tx/rx node 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the tx/rx node 310. These soft decisions may be based on channel estimates computed by the channel estimator 358. The soft decisions are then decoded and deinterleaved to recover the data and control signals that were originally transmitted by the tx/rx node 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the tx/rx node 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the tx/rx node 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the tx/rx node 310 in a manner similar to that described in connection with the receiver function at the tx/rx node 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the tx/rx node 350. IP packets from the controller/processor 375 may be provided to the EPC 160. The controller/processor 375 is also responsible for error detection using an ACK and/or NACK protocol to support HARQ operations.

In an implementation, at least one of the TX processor 368, the RX processor 356, and the controller/processor 359 may be configured to perform aspects in connection with component 127 of FIG. 1.

In an implementation, at least one of the TX processor 316, the RX processor 370, and the controller/processor 375 may be configured to perform aspects in connection with component 121 of FIG. 1.

Figure 4:
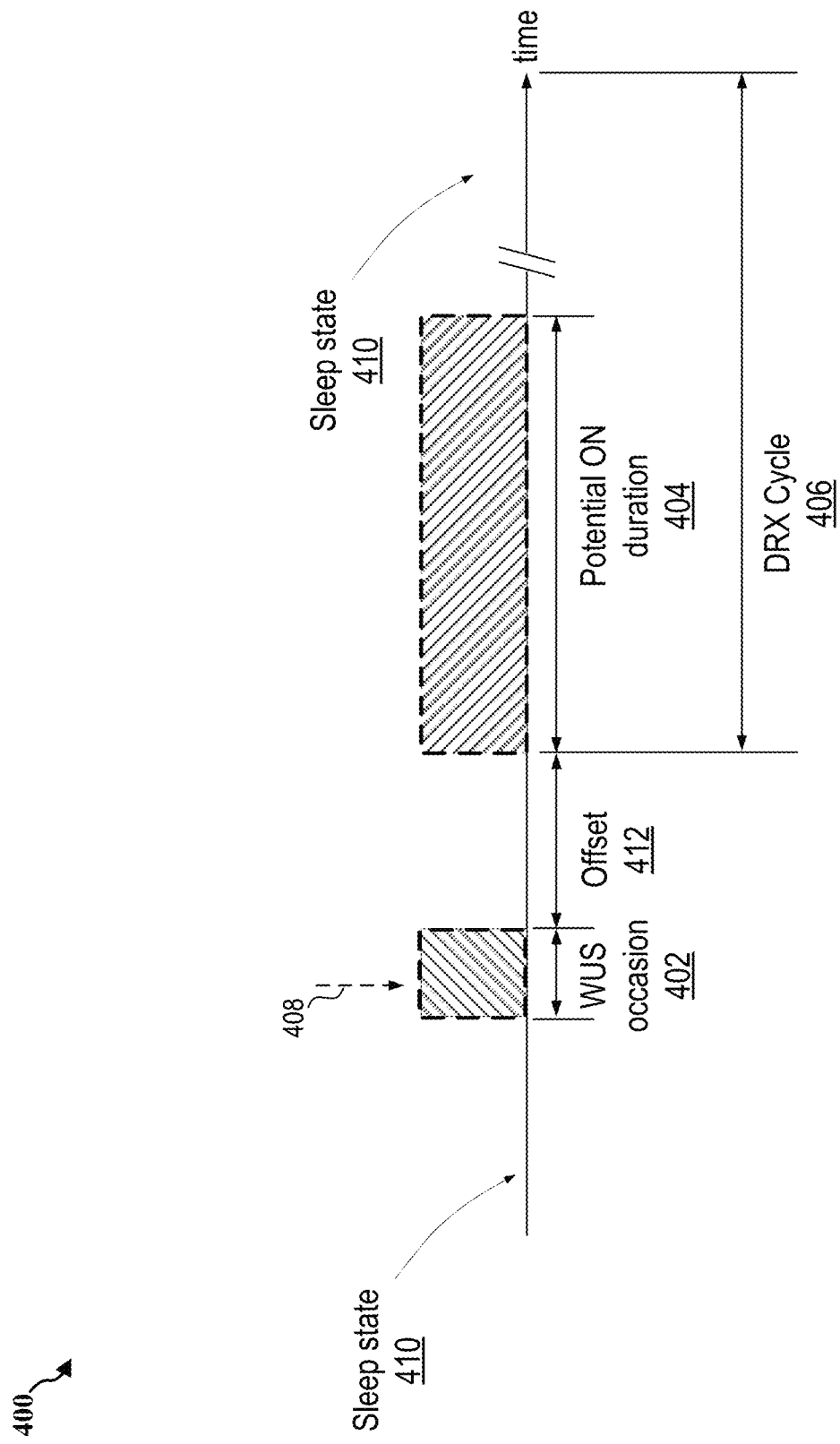
FIG. 4 is a schematic diagram of an example timeline of a wake-up signal occasion and a potential ON duration over time during a discontinuous reception cycle, according to some aspects of the present disclosure.

Referring to FIG. 4, the present aspects generally relate to wake-up signaling, as represented by an example timeline 400 including a wake-up signal (WUS) occasion 402 and a potential ON duration 404, over time, both of which may be associated with a discontinuous reception cycle 406 (e.g., connected mode DRX) of the UE 104. In general, 5G New Radio (NR) Release-16 (henceforth Rel-16) establishes a WUS 408 to be received by the UE 104 during the WUS occasion 402 for improved power efficiency during connected mode discontinuous reception (C-DRX) operation, e.g., the DRX cycle 406. The principal of the WUS 408 is to reduce the chance of unnecessary wake-up of the UE 104 during legacy discontinuous reception (DRX) operation. In legacy DRX, the UE 104 cyclically enters and exits sleeping state/mode 410 to monitor for incoming data while conserving power. Specifically, the UE 104 determines whether the WUS 408, indicating the UE 104 to wake-up, has been received from the base station 102 during the WUS occasion 402. If the WUS 408 is received, the UE 104 initiates the ON duration 404, during which the UE 104 monitors the Physical Downlink Control Channel (PDCCH). If the WUS 408 is not received, the UE 104 remains in sleeping state/mode 410 to conserve power.

In Rel-16, a PDCCH-based WUS has been adopted for power saving. The PDCCH-based WUS 408 can be transmitted before the ON duration 404 by an offset time period 412. Depending on whether the WUS 408 directing the UE 104 to wake-up is received, the ON duration 404 may be skipped and is hence labeled as a "potential" ON duration 404. In other words, the UE 104 initializes a minimum amount of hardware components to detect the WUS 104. Subsequent to detecting the WUS 408 during the WUS occasion 402, the UE 104 uses the offset time period 412 to initialize any additional hardware components used to monitor the PDCCH. Dedicated search space sets define the WUS occasion configuration.

Figure 5:
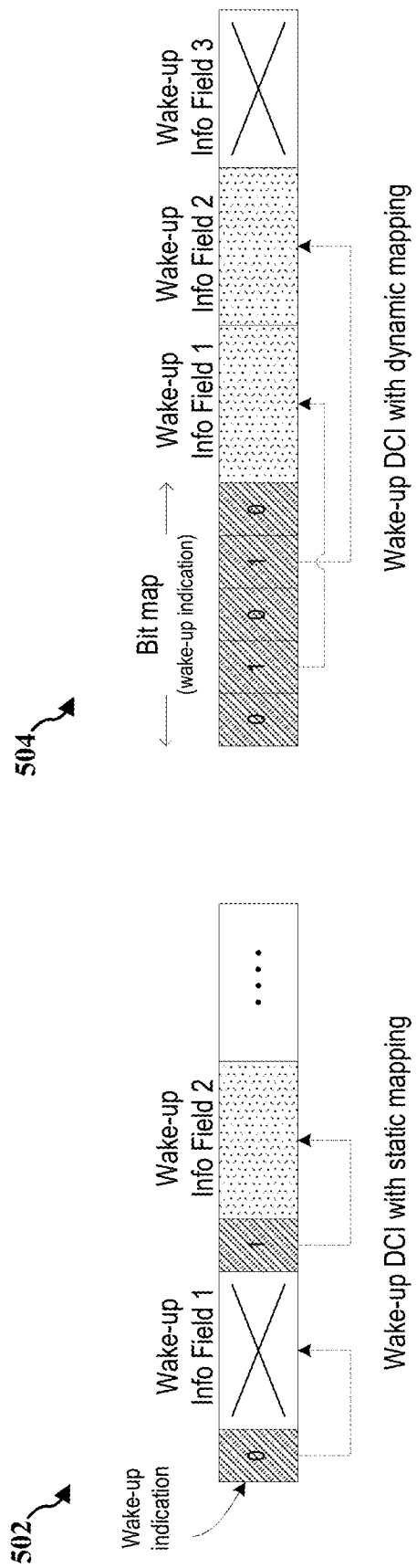
FIG. 5 is a schematic diagram of an example wake-up signal having a static field mapping and an example wake-up signal having a dynamic field mapping, according to some aspects of the present disclosure.

Referring to FIG. 5, example wake-up signals 502 and 504 may be PDCCH-based WUS, which may be transmitted in the primary cell or primary secondary cell. The wake-up downlink control information (DCI), which is carried by the PDCCH-based WUS such as wake-up signals 502 and 504, has a cyclic redundancy check (CRC), which is scrambled by a Power Saving Radio Network Temporary Identifier (PS-RNTI). The PS-RNTI enables multiple UEs to share the same PDCCH-WUS with per-UE wake-up indicator fields. Wake-up signals 502 and 504 depict two mapping candidates for a wake-up DCI: static (502) and dynamic (504). Both of example wake-up signals 502 and 504 include wake-up indication fields and also may include a wake-up information field corresponding to one or more of the wake-up indication fields. The wake-up indication fields may carry a bit to indicate to a UE assigned to the given field whether or not to wake-up. The wake-up information fields may carry additional information for the corresponding UE. For example, the wake-up information fields may include aperiodic channel state information reference signal (A-CSI-RS) triggering, an indication of PDCCH monitoring reduction, bandwidth part (BWP) switching and/or SCell-group wake-up.

In static mapping, each UE 104 is assigned a single field featuring a wake-up indication field and a wake-up information field. For instance, in example wake-up signal 502, at least two fields, each assigned to a different UE, are shown. In other words, in static mapping, a size or length of the wake-up signal 502 may be fixed so as to include a separate wake-up indication field and corresponding wake-up information field for each UE in the wake-up group. As such, in a case where no wake-up is signaled, e.g., wake-up indication field having a value of "0," the wake-up signal 502 still includes the corresponding wake-up information field, even though it may not include any information.

In dynamic mapping, a particular UE 104 may have a fixed assignment in the wake-up indication field, but a dynamic assignment in the wake-up information field. For instance, in example wake-up signal 504, each indicator in the wake-up indication field bit map is associated with a particular UE. When the indicator is set to "1," the respective UE is to wake-up for the next ON duration and if the indicator is set to "0," the respective UE can remain in sleeping mode. In this example, the second indicator, which corresponds to a particular UE, is the first indicator that is set to "1" in the wake-up indication field bit map and further corresponds to "wake-up information field 1." The fourth indicator, which corresponds to a different UE, is the second indicator that is set to "1" in the wake-up indication field bit map and corresponds to "wake-up information field 2," which may be located after "wake-up information field 1." In dynamic mapping, because all the UEs in the group may not always have to be woken up simultaneously, e.g., all wake-up indications set to "1," the dynamically mapped wake-up signal may have a size or length of the wake-up information fields that is less than a size or length of a corresponding statically mapped wake-up signal 504 supporting the same number of UEs. That is, some implementations may save resources by shortening the information field size or length. As such, for the dynamically mapped wake-up signal 504, the size or length of the wake-up indication field may be fixed based on a number of UEs in the group, but the size or length of the corresponding wake-up information fields may be less than the information field size times the number of UEs in the group.

In other words, in a typical situation, the base station 102 does not have to wake-up all UEs 104 in a group, and therefore not all wake-up indication bits are set to "1." Because a corresponding information field is not present for UEs whose wake-up indication bits are equal to "0," dynamic mapping allows for a smaller payload size (with a full bit map of indication bits, but information fields only for the UEs with bits set to '1') than static mapping. As such, a benefit of dynamic mapping may be that, because it would be very unlikely that the base station needs to wake up more than a given number (such as but not limited to 3) of UEs simultaneously (e.g., it would be rare that all UEs in the group have data to be served at the same moment), having a smaller number of fields than the number of UEs in the group may not have a significant blocking issue.

To further save system resources, the base station may not transmit wake-up signals 502 and 504, e.g., the PDCCH-WUS, if the wake-up indication bits are all "0."

Figure 6:
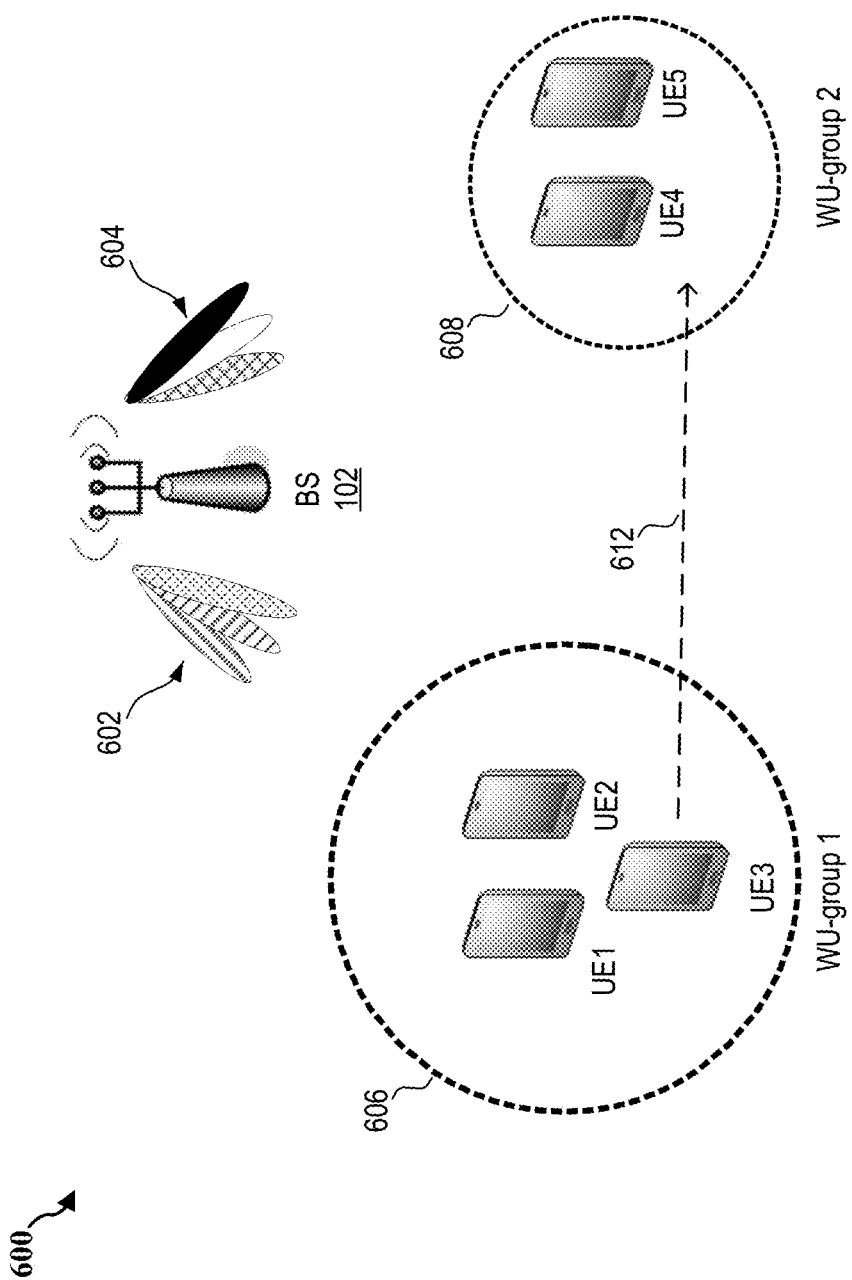
FIG. 6 is a schematic diagram of an example group wake-up reconfiguration scenario where a UE moves from a first wake-up group to a second wake-up group, according to some aspects of the present disclosure.

Referring to FIG. 6, a dynamic group wake-up reconfiguration scenario 600 includes one of the UEs in a first wake-up group (WU-group), e.g., UE 3 in WU-group 1, moving to a new location and being reconfigured to be associated with a second WU-group, e.g., WU-group 2.

As discussed above, a group-specific WUS is more network resource-efficient as compared to a UE-specific WUS. For example, the base station 102 may group together UEs having the same wake-up signal (e.g., PDCCH-WUS) configuration and the same or similar discontinuous reception (e.g., C-DRX) configuration in a same WU-group. For a particular WU-group, the PDCCH-WUS configuration includes information such as WU-search space sets, WU-CORESETs, WU-bandwidth parts (BWP), WU-beams (e.g., FR2), etc. Further, the C-DRX configuration includes information such as the DRX cycle, offset, etc. Configuration of PDCCH-WUS uses the same PDCCH configuration mechanism for other types of PDCCH.

In some cases, re-mapping of wake-up information fields in a group wake-up DCI and/or re-grouping of UEs may be performed. For example, a DRX configuration of a UE may change based on traffic status, or a UE may switch to/from radio resource control (RRC) idle/inactive states and may be excluded from the group. Additionally, for example, due to mobility of a UE, the UE may hop from one group to another within a cell (or between base stations), or move from one cell to another.

In example scenario 600, the base station 102 is providing signals 602, 604 (which may be beams) to WU-group 1 (featuring UE1, UE2, and UE3) and WU-group 2 (featuring UE4 and UE5). WU-group 1 is in a different geographical location 606 from the geographic location 608 of WU-group 2. When UE3 moves from the geographical location 606 associated with WU-group 1 to the geographical location 608 associated with WU-group 2, as indicated by dashed line 612, the base station 102 will re-group UE3 to WU-group 2. In prior solutions, the reconfiguration of the group wake-up configuration in this scenario demands a large signaling overhead and high latency by using RRC signaling, which may be disadvantageous to UE power saving. The present solution overcomes this drawback by using Layer 1 and/or Layer 2 signaling, such as PDCCH-WUS, which may use the same configuration mechanism as used in other types of PDCCH signaling.

In particular, the disclosure herein discusses dynamic re-mapping of a WUS group to overcome the large signaling overhead and high latency when re-mapping fields in a DCI and/or re-grouping UEs. Rather than utilizing RRC signaling, configuration of group-specific PDCCH-WUS can be modified by L1/L2 signaling. The signaling can either be UE-specific or group-specific. For re-grouping, multiple sets of PDCCH-WUSs may be configured for a particular UE. Subsequently, one appropriate configuration of the multiple configurations, each of which may correspond to a particular WU-group, may be selected by the L1/L2 signaling. For re-mapping, one or more parameters associated with the current PDCCH-WUS can be modified by the L1/L2 signaling.

Signaling may be triggered by a UE's request or autonomously by a base station (e.g., based on the UE's measurement/report). A candidate indication mechanism may be PDCCH-WUS or a separate indication such as PDCCH and MAC control element (CE). The separate indication may feature at least one or a combination of: (1) one or more DCI during UE's Active Time (the time UE needs to monitor the PDCCH from the base station), (2) one or more DCI (e.g., CRC scrambled by an RNTI other than PS-RNTI, such as Cell-RNTI) transmitted on WU-search space sets, (3) one or more MAC control element (CE) carried on PDSCH during UE's Active Time. In the case of PDCCH-WUS, in an instance where the wake-up indicator is "0," the corresponding wake-up information filed can be re-purposed for a re-mapping indication.

Candidate parameters for dynamic re-mapping include the wake-up DCI size, the position or rules for determining position of a wake-up information field assigned to a UE in the wake-up DCI and the size of the field. Candidate parameters for re-mapping also include the position of a wake-up indicator and the overall size of the wake-up indicator field (e.g., for dynamic mapping). Candidate parameters for re-grouping include DRX parameters such as cycle and offset, as well as PS-RNTI or group identity parameters.

Figure 7:
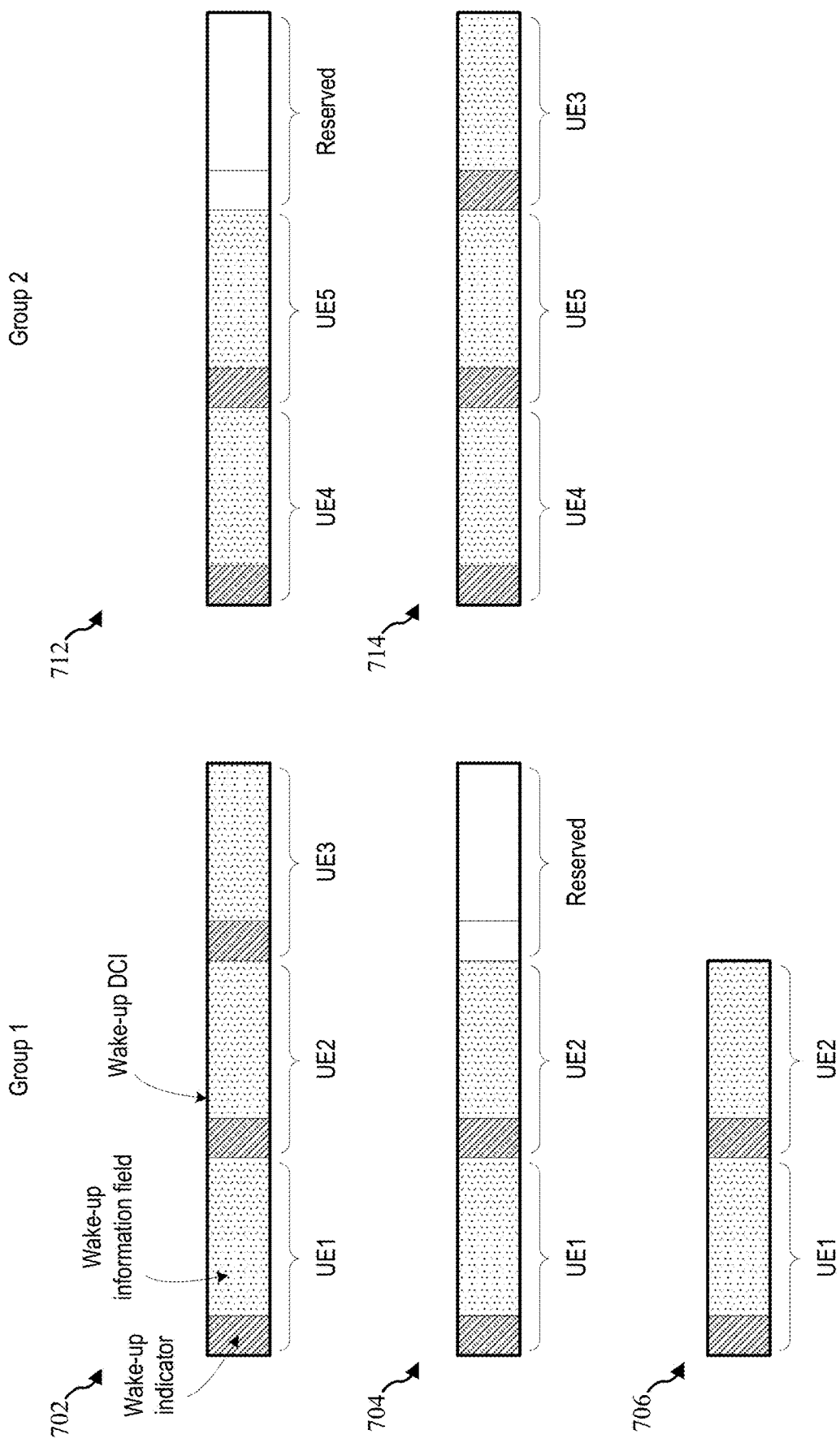
FIG. 7 is a schematic diagram of an example of dynamic reconfiguration of wake-up signal structures in a scenario where a UE moves from a first wake-up group to a second wake-up group, according to some aspects of the present disclosure.

Referring to FIG. 7, an example of dynamically reconfiguring wake-up signals (e.g., wake-up DCIs) 702 and 704 with static mapping based on UE3 changing wake-up groups is described with reference to the example scenario 600 (see FIG. 6). Referring back to FIG. 6, WU-group 1 includes UE1, UE2, and UE3, and WU-group 2 includes UE4 and UE5. In FIG. 7, the first wake-up DCI 702 of WU-group 1 features three wake-up indicators, each followed by a wake-up field associated with the respective UE. The first wake-up DCI 712 of WU-group 2 features two wake-up indicators and fields, followed by a reserved wake-up indicator and field. When UE3 moves from the geographical location 606 associated with WU-group 1 to the geographical location 608 associated with WU-group 2, UE3 transmits a signal to the base station 102 requesting a new grouping configuration. In response to receiving the signal, the base station 102 generates new wake-up DCIs. In this example, the third indicator and third field in the wake-up DCI 702 of WU-group 1 becomes reserved, thereby defining a second wake-up DCI 704 of WU-group 1, and the third indicator and third field in the wake-up DCI 712 of WU-group 2 is assigned to UE3, thereby defining a second wake-up DCI 714 of WU-group 2. During this process, UE3 is signaled with a new PS-RNTI (i.e., the PS-RNTI of WU-group 2) and UE3 is signaled with the position of WU-information field in Group 2's wake-up DCI (see the second wake-up DCI 714 in WU-group 2). Referring to the second wake-up DCI 704 of WU-group 1, the third field is reserved for a potential new UE.

In some embodiments, the base station 104 may re-size the wake-up DCI of WU-group 1 (see the third wake-up DCI 706 of WU-group 1) by removing the indicator and field previously associated with UE3. By shrinking the size, the base station 102 conserves processing resources.

Figure 8:
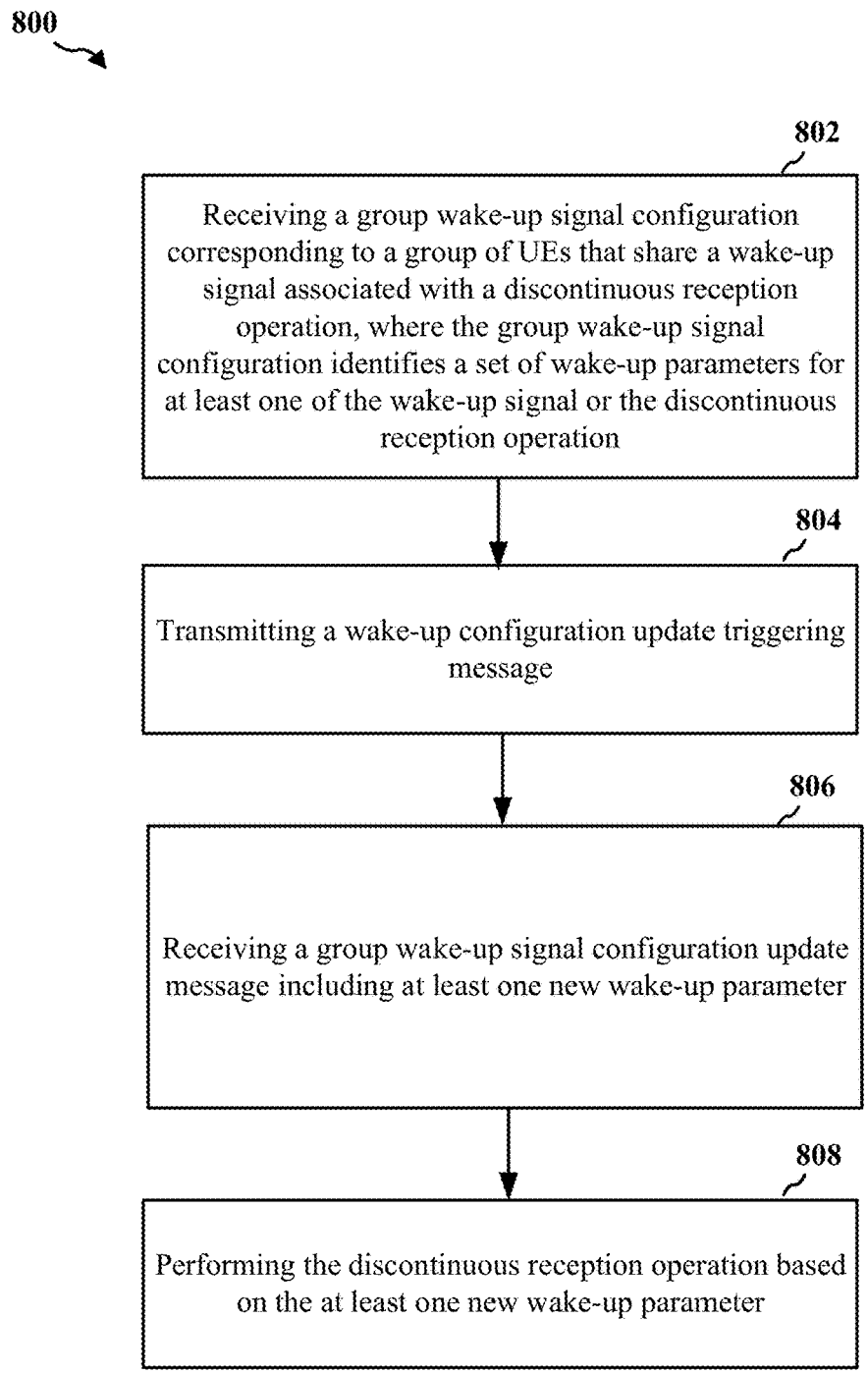
FIG. 8 is a flowchart of an example method of wireless communication of a UE operable in the system of FIG. 1, according to some aspects of the present disclosure.
Figure 10:
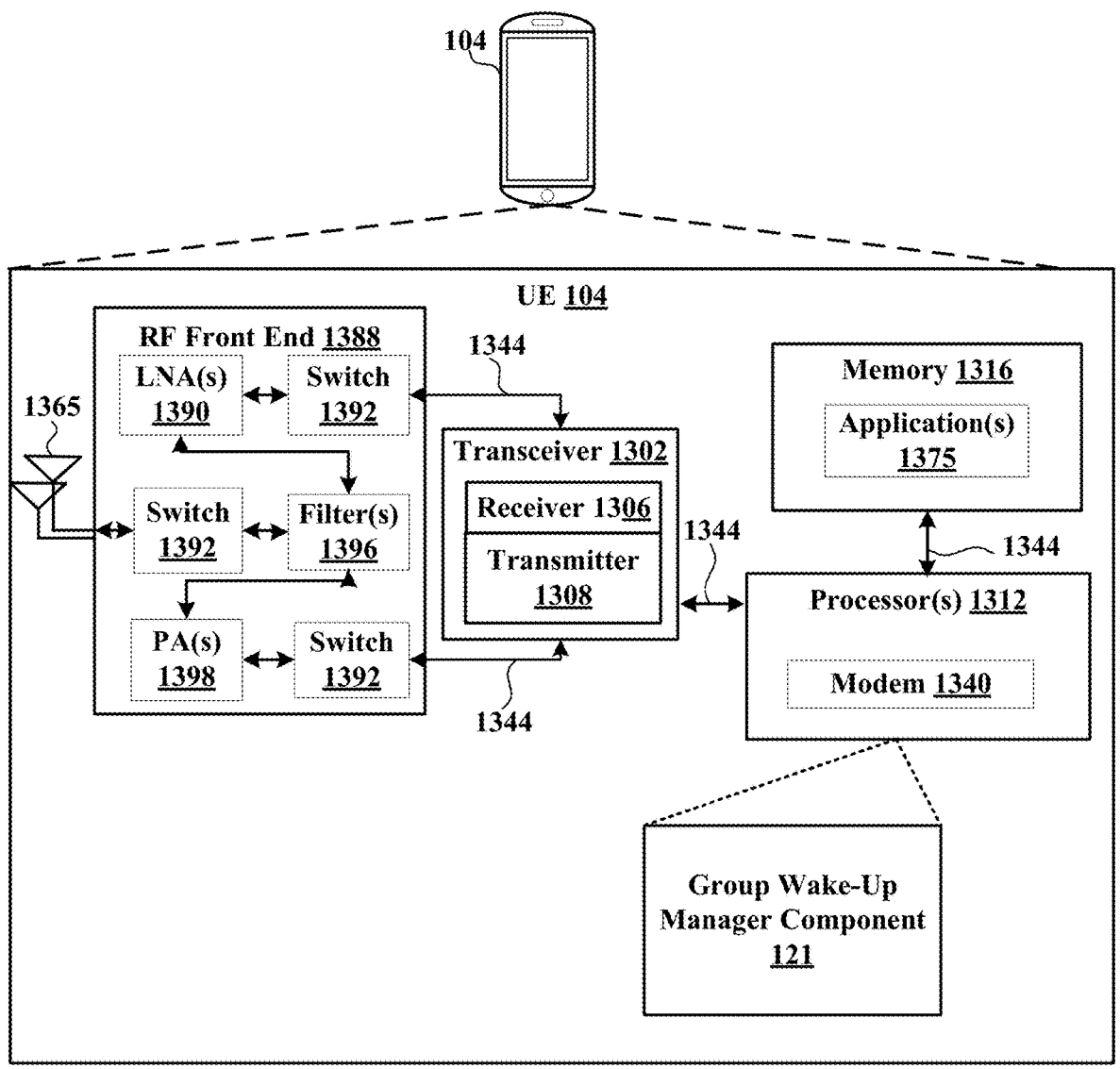
FIG. 10 is a block diagram of an example UE, according to some aspects of the present disclosure.

Referring to FIG. 8, an example method 800 of wireless communication may be performed by the UE 104, which may include one or more components as discussed in FIG. 1, 3, or 10, and which may operate to perform dynamic group wake-up reconfiguration as discussed above with regard to FIGS. 4-7.

At 802, method 800 includes receiving a group wake-up signal configuration corresponding to a group of UEs that share a wake-up signal associated with a discontinuous reception operation, where the group wake-up signal configuration identifies a set of wake-up parameters for at least one of the wake-up signal or the discontinuous reception operation. For example, in an aspect, the UE 104 may operate one or any combination of antennas 1365, RF front end 1388, transceiver 1302, processor 1312, memory 1316, modem 1340, or group wake-up manager component 121 to receive a group wake-up signal configuration corresponding to a group of UEs that share a wake-up signal associated with a discontinuous reception operation, where the group wake-up signal configuration identifies a set of wake-up parameters for at least one of the wake-up signal or the discontinuous reception operation. For example, based on operating receive chain components to monitor time/frequency resources, the UE 104 may receive a wireless signal carrying the group wake-up configuration and process the signal (e.g., demodulate, decode, etc.), as described above, to obtain the information defining the group wake-up signal configuration. Additional aspects regarding receiving a group wake-up configuration are discussed above in more detail with respect to FIGS. 4-7. Accordingly, in an aspect, the UE 104, antennas 1365, RF front end 1388, transceiver 1302, processor 1312, memory 1316, modem 1340, and/or group wake-up manager component 121 may provide means for receiving a group wake-up signal configuration corresponding to a group of UEs that share a wake-up signal associated with a discontinuous reception operation, where the group wake-up signal configuration identifies a set of wake-up parameters for at least one of the wake-up signal or the discontinuous reception operation.

At 804, method 800 includes transmitting a wake-up configuration update triggering message. For example, in an aspect, the UE 104 may operate one or any combination of transceiver 1302, processor 1312, memory 1316, modem 1340, or group wake-up manager component 121 to transmit a wake-up configuration update triggering message. For example, the UE 104 may transmit the wake-up configuration update triggering message in response to a change in traffic status, a change in mode, or a change in location, such as by generating the message with the processor 1312 and transmitting the message via the transmit chain components. Additional aspects regarding transmitting a wake-up configure update triggering message are discussed above in more detail with respect to FIGS. 4-7. Accordingly, in an aspect, the UE 104, antennas 1365, RF front end 1388, transceiver 1302, processor 1312, memory 1316, modem 1340, and/or group wake-up manager component 121 may provide means for transmitting a wake-up configuration update triggering message.

At 806, method 800 includes receiving a group wake-up signal configuration update message including at least one new wake-up parameter. For example, in an aspect, the UE 104 may operate one or any combination of antennas 1365, RF front end 1388, transceiver 1302, processor 1312, memory 1316, modem 1340, or group wake-up manager component 121 to receive a group wake-up signal configuration update message including at least one new wake-up parameter. For example, based on operating receive chain components to monitor time/frequency resources, the UE 104 may receive and process (e.g., demodulate, decode, etc.) a wireless signal such as a PDCCH-WUS, a DCI during an active time (e.g., not in the sleep state), a DCI transmitted on a search space set, which may include information on the at least one new wake-up parameter. Additional aspects regarding receiving a group wake-up signal configuration update message are discussed above in more detail with respect to FIGS. 4-7. Accordingly, in an aspect, the UE 104, antennas 1365, RF front end 1388, transceiver 1302, processor 1312, memory 1316, modem 1340, and/or group wake-up manager component 121 may provide means for receiving a group wake-up signal configuration update message including at least one new wake-up parameter.

At 808, method 800 includes performing the discontinuous reception operation based on the at least one new wake-up parameter. For example, in an aspect, the UE 84 may operate one or any combination of antennas 1365, RF front end 1388, transceiver 1302, processor 1312, memory 1316, modem 1340, group wake-up manager component 121 to perform the discontinuous reception operation based on the at least one new wake-up parameter. For example, based on operating transmit and receive chain components, the UE 104 may monitor time/frequency resources during WUS occasions and corresponding monitor time/frequency resources based on a WUS indication, or continue to maintain a sleep state, all in accordance with a configuration of the group WUS and DRX cycle of the UE. Additional aspects regarding performing the discontinuous reception operation based on the at least one new wake-up parameter are discussed above in more detail with respect to FIGS. 4-7. Accordingly, in an aspect, the UE 104, antennas 1365, RF front end 1388, transceiver 1302, processor 1312, memory 1316, modem 1340, and/or group wake-up manager component 121 may provide means for performing the discontinuous reception operation based on the at least one new wake-up parameter.

In some implementations of method 800, receiving the group wake-up signal configuration includes receiving a Layer 1 or Layer 2 signaling.

In some implementations of method 800, receiving the group wake-up signal configuration update message includes receiving a Layer 1 or Layer 2 signaling.

In some implementations of method 800, the at least one new wake-up parameter includes at least one of: one or more of search space set, a control resource set, a bandwidth part, a cell, or a beam associated with the wake-up signal; one or more of a discontinuous reception cycle periodicity or an offset value associated the discontinuous reception operation; a wake-up group identifier associated with the wake-up signal; a wake-up group scrambling code or radio network temporary identifier associated with the wake-up signal; a wake-up signal size associated with the wake-up signal; a wake-up information field position of a wake-up information field corresponding to the UE in the wake-up signal; a wake-up information field size of the wake-up information field corresponding to the UE in the wake-up signal; or a wake-up indicator position corresponding to the UE in the wake-up signal.

In some implementations of method 800, the at least one new wake-up parameter of the group wake-up signal configuration update message causes a re-mapping of the UE with respect to the group wake-up signal configuration corresponding to the group of UEs, or causes the UE to be re-grouped into a new group wake-up signal configuration corresponding to a new group of UEs that share a new wake-up signal associated with a new discontinuous reception operation.

In some implementations of method 800, the group wake-up signal configuration includes a first group wake-up signal configuration corresponding to a first group of UEs, a first configuration of the wake-up signal, and a first configuration of the discontinuous reception operation, the at least one new wake-up parameter of the group wake-up signal configuration update message identifies a second group wake-up signal configuration corresponding to a second group of UEs, a corresponding second configuration of the wake-up signal, and corresponding a second configuration of the discontinuous reception operation, and performing the discontinuous reception operation includes monitoring for the second configuration of the wake-up signal of the second group wake-up signal configuration corresponding to the second group of UEs.

In some implementations of method 800, the first group wake-up signal configuration identifies a first set of wake-up parameters for at least one of the first configuration of the wake-up signal or the first configuration of the discontinuous reception operation, the second group wake-up group configuration identifies a second set of wake-up parameters for at least one of the second configuration of the wake-up signal or the second configuration of the discontinuous reception operation, and the monitoring for the second configuration of the wake-up signal includes monitoring according to the second set of wake-up parameters for at least one of the second wake-up signal or the second configuration of the discontinuous reception operation.

In some implementations of method 800, the second set of wake-up parameters for at least one of the second configuration of the wake-up signal or the second configuration of the discontinuous reception operation includes at least one of: one or more of search space set, a control resource set, a bandwidth part, a cell, or a beam associated with the second configuration of the wake-up signal; one or more of a discontinuous reception cycle periodicity or an offset value associated with the second configuration of the discontinuous reception operation; a wake-up group identifier associated with the second configuration of the wake-up signal; a wake-up group scrambling code or radio network temporary identifier associated with the second configuration of the wake-up signal; a wake-up signal size associated with the second configuration of the wake-up signal; a wake-up information field position of a wake-up information field corresponding to the UE in the second configuration of the wake-up signal; a wake-up information field size of the wake-up information field corresponding to the UE in the second configuration of the wake-up signal; or a wake-up indicator position corresponding to the UE in the second configuration of the wake-up signal.

In some implementations of method 800, the wake-up information field corresponding to the UE in the second configuration of the wake-up signal is a new field or replaces a reserved field in the second configuration of the wake-up signal.

In some implementations of method 800, the group wake-up signal includes a downlink control information message having a plurality of fields including one or more of a wake-up indicator field and a corresponding wake-up information field each associated with a specific UE of the group of UEs.

In some implementations of method 800, the at least one new wake-up parameter of the group wake-up signal configuration update message identifies a new information field position of a wake-up information field corresponding to the UE in the wake-up signal, where the wake-up information field corresponding to the UE is a new field or replaces a reserved field in the wake-up signal.

In some implementations of method 800, receiving the group wake-up signal configuration update message includes receiving a UE-specific message or a group-specific message.

In some implementations of method 800, transmitting the wake-up configuration update triggering message includes transmitting a UE wake-up configuration update request, or transmitting a measurement report.

In some implementations of method 800, receiving the group wake-up signal configuration update message includes receiving at least one of: a wake-up control signal; one or more control signals different from the wake-up control signal and received outside of a wake-up signal occasion corresponding to the wake-up control signal; one or more control signals having a scrambling code different from the wake-up control signal and received during the wake-up signal occasion corresponding to the wake-up control signal; or a control element in a downlink payload associated with user data.

In some implementations of method 800, receiving the group wake-up signal configuration update message includes receiving a wake-up control signal having a wake-up indicator identifying that the UE does not need to wake-up, and further having a UE-specific wake-up information field having a re-mapping indicator including the at least one new wake-up parameter configured to re-map a configuration of the UE relative to the group of UEs or having a re-grouping indicator including the at least one new wake-up parameter configured to re-group the UE with a new group of UEs, and further including modifying the set of wake-up parameters of the group wake-up signal configuration based on the re-mapping indicator or the re-grouping indicator and the at least one new wake-up parameter to define a modified group wake-up signal configuration, where performing the discontinuous reception operation is further based on the modified group wake-up signal configuration.

In some implementations of method 800, receiving the group wake-up signal configuration update message includes receiving the wake-up signal having a dedicated re-mapping information field that includes re-mapping information or a dedicated re-grouping information field that includes re-grouping information, and further including modifying the set of wake-up parameters of the group wake-up signal configuration based on the re-mapping information or the re-grouping information to define a modified group wake-up signal configuration, where performing the discontinuous reception operation is further based on the modified group wake-up signal configuration.

Figure 9:
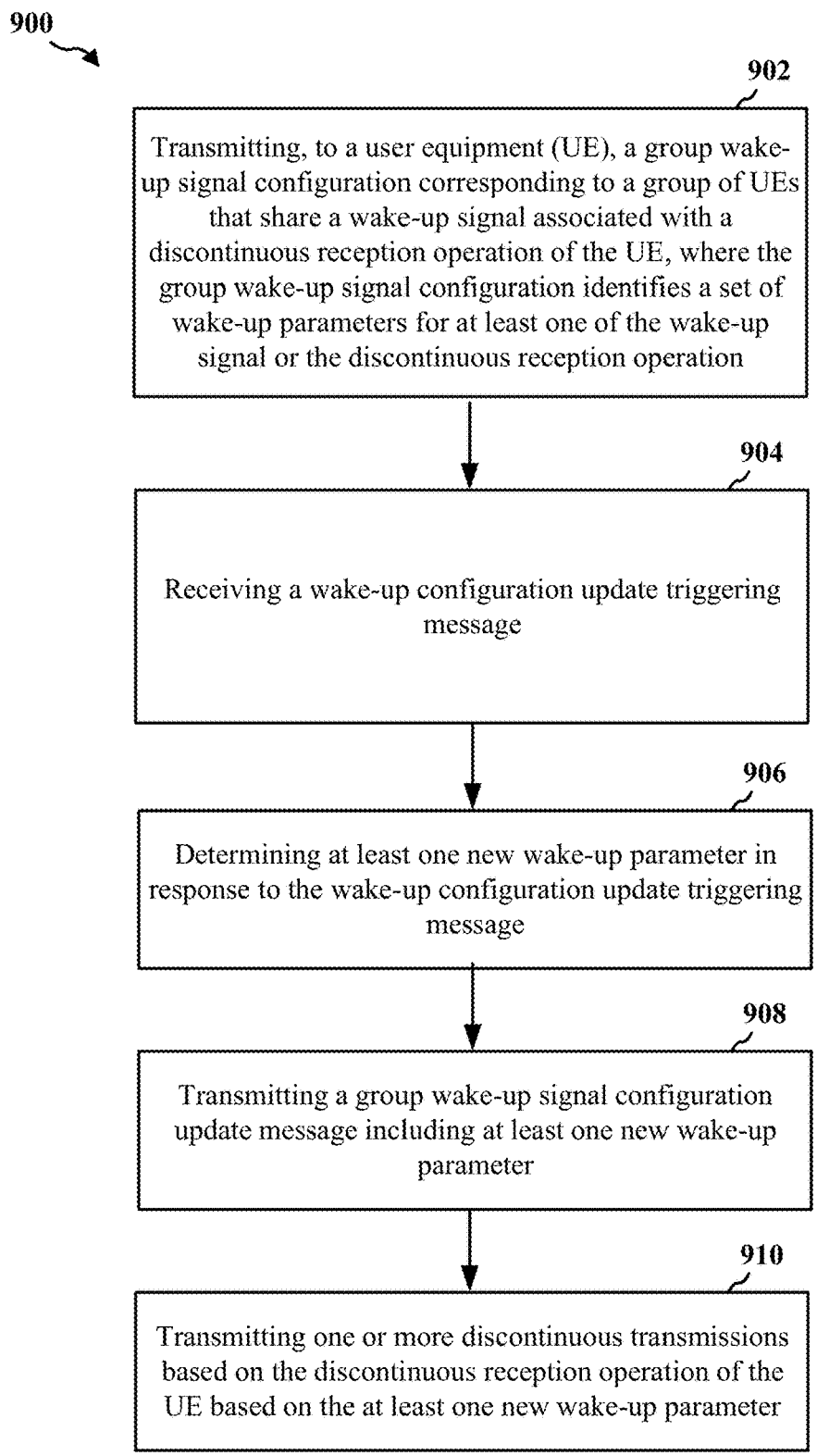
FIG. 9 is a flowchart of another example method of wireless communication of a base station operable in the system of FIG. 1, according to some aspects of the present disclosure.
Figure 11:
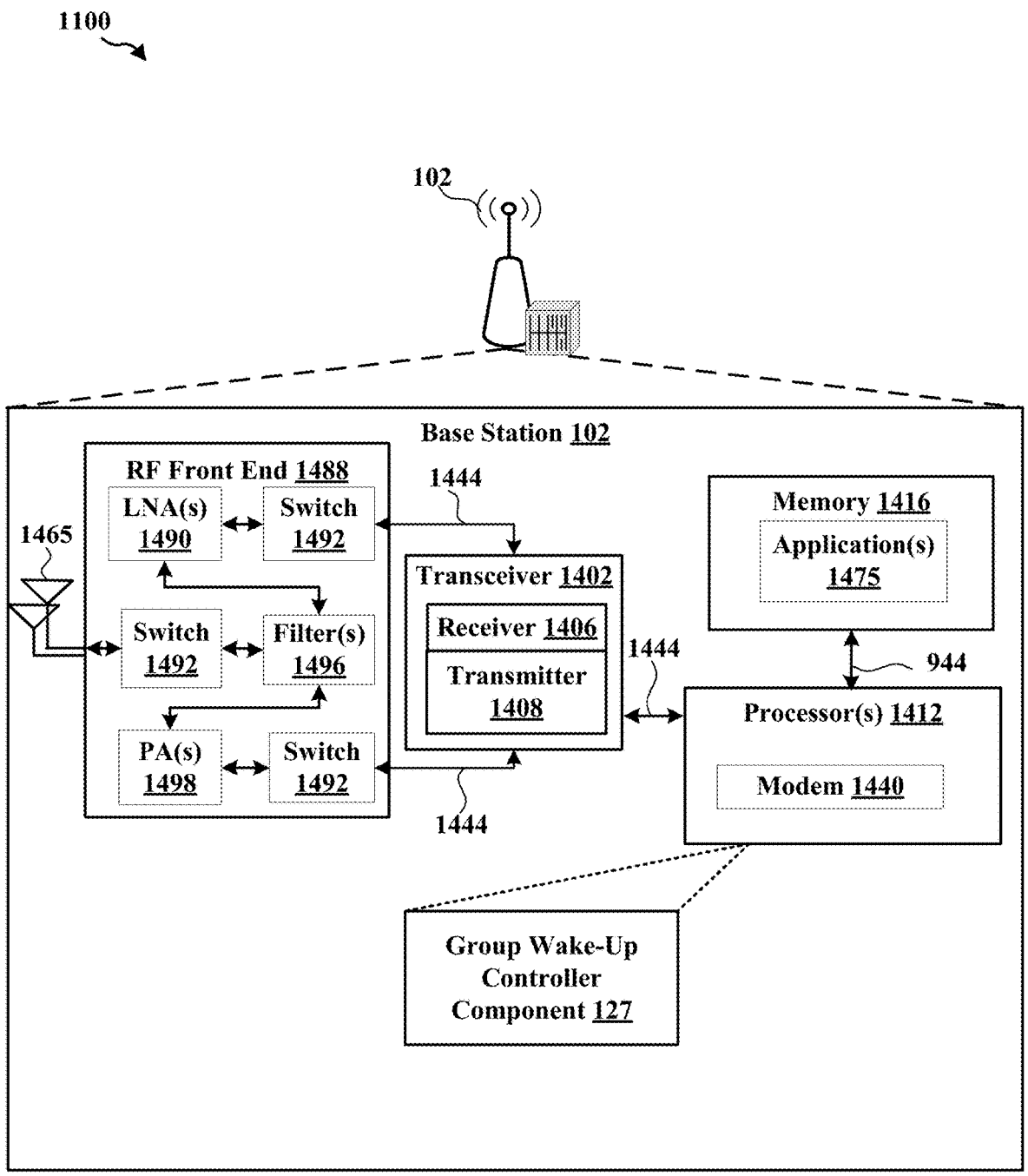
FIG. 11 is a block diagram of an example base station, according to some aspects of the present disclosure.

Referring to FIG. 9, an example method 900 of wireless communication may be performed by a base station 102, which may include one or more components as discussed in FIG. 1, 3, or 11, and which may operate to perform dynamic group wake-up reconfiguration as discussed above with regard to FIGS. 4-7.

At 902, method 900 includes transmitting, to a UE, a group wake-up signal configuration corresponding to a group of UEs that share a wake-up signal associated with a discontinuous reception operation of the UE, where the group wake-up signal configuration identifies a set of wake-up parameters for at least one of the wake-up signal or the discontinuous reception operation. For example, in an aspect, the base station 102 may operate to perform one or any combination of antennas 1465, RF front end 1488, transceiver 1402, processor 1412, memory 1416, modem 1440, or group wake-up controller component 127 to transmit, to a UE, a group wake-up signal configuration corresponding to a group of UEs that share a wake-up signal associated with a discontinuous reception operation of the UE, where the group wake-up signal configuration identifies a set of wake-up parameters for at least one of the wake-up signal or the discontinuous reception operation. Additional aspects regarding transmitting, to a UE, a group wake-up signal configuration are discussed above in more detail with respect to FIGS. 4-7. Accordingly, in an aspect, the base station 102, antennas 1465, RF front end 1488, transceiver 1402, processor 1412, memory 1416, modem 1440, and/or group wake-up controller component 127 may provide means for transmitting, to a UE, a group wake-up signal configuration corresponding to a group of UEs that share a wake-up signal associated with a discontinuous reception operation of the UE, where the group wake-up signal configuration identifies a set of wake-up parameters for at least one of the wake-up signal or the discontinuous reception operation.

At 904, method 900 includes receiving a wake-up configuration update triggering message. For example, in an aspect, the base station 102 may operate one or any combination of antennas 1465, RF front end 1488, transceiver 1402, processor 1412, memory 1416, modem 1440, or group wake-up controller component 127 to receive a wake-up configuration update triggering message. Additional aspects regarding receiving a wake-up configuration update triggering message are discussed above in more detail with respect to FIGS. 4-7. Accordingly, in an aspect, the base station 102, antennas 1465, RF front end 1488, transceiver 1402, processor 1412, memory 1416, modem 1440, and/or group wake-up controller component 127 may provide means for receiving a wake-up configuration update triggering message.

At 906, method 900 includes determining at least one new wake-up parameter in response to the wake-up configuration update triggering message. For example, in an aspect, the base station 102 may operate one or any combination of antennas 1465, RF front end 1488, transceiver 1402, processor 1412, memory 1416, modem 1440, or group wake-up controller component 127 to determine at least one new wake-up parameter in response to the wake-up configuration update triggering message. Additional aspects regarding determining at least one new wake-up parameter are discussed above in more detail with respect to FIGS. 4-7. Accordingly, in an aspect, the base station 102, antennas 1465, RF front end 1488, transceiver 1402, processor 1412, memory 1416, modem 1440, and/or group wake-up controller component 127 may provide means for determining at least one new wake-up parameter in response to the wake-up configuration update triggering message.

At 908, method 900 includes transmitting a group wake-up signal configuration update message including at least one new wake-up parameter. For example, in an aspect, the base station 102 may operate one or any combination of antennas 1465, RF front end 1488, transceiver 1402, processor 1412, memory 1416, modem 1440, or group wake-up controller component 127 to transmit a group wake-up signal configuration update message including at least one new wake-up parameter. Additional aspects regarding transmitting a group wake-up signal configuration update message are discussed above in more detail with respect to FIGS. 4-7. Accordingly, in an aspect, the base station 102, antennas 1465, RF front end 1488, transceiver 1402, processor 1412, memory 1416, modem 1440, and/or group wake-up controller component 127 may provide means for transmitting a group wake-up signal configuration update message including at least one new wake-up parameter.

At 910, method 900 includes transmitting one or more discontinuous transmissions based on the discontinuous reception operation of the UE based on the at least one new wake-up parameter. For example, in an aspect, the base station 102 may operate one or any combination of antennas 1465, RF front end 1488, transceiver 1402, processor 1412, memory 1416, modem 1440, or group wake-up controller component 127 to transmit one or more discontinuous transmissions based on the discontinuous reception operation of the UE based on the at least one new wake-up parameter. Additional aspects regarding transmitting one or more discontinuous transmissions based on the discontinuous reception operation of the UE based on the at least one new wake-up parameter are discussed above in more detail with respect to FIGS. 4-7. Accordingly, in an aspect, the base station 102, antennas 1465, RF front end 1488, transceiver 1402, processor 1412, memory 1416, modem 1440, and/or group wake-up controller component 127 may provide means for transmitting one or more discontinuous transmissions based on the discontinuous reception operation of the UE based on the at least one new wake-up parameter.

In an implementation of method 900, transmitting the group wake-up signal configuration includes transmitting a Layer 1 or Layer 2 signaling.

In an implementation of method 900, transmitting the group wake-up signal configuration update message includes transmitting a Layer 1 or Layer 2 signaling.

In an implementation of method 900, the at least one new wake-up parameter includes at least one of: one or more of search space set, a control resource set, a bandwidth part, a cell, or a beam associated with the wake-up signal; one or more of a discontinuous reception cycle periodicity or an offset value associated the discontinuous reception operation; a wake-up group identifier associated with the wake-up signal; a wake-up group scrambling code or radio network temporary identifier associated with the wake-up signal; a wake-up signal size associated with the wake-up signal; a wake-up information field position of a wake-up information field corresponding to the UE in the wake-up signal; a wake-up information field size of the wake-up information field corresponding to the UE in the wake-up signal; or a wake-up indicator position corresponding to the UE in the wake-up signal.

In an implementation of method 900, the at least one new wake-up parameter of the group wake-up signal configuration update message causes a re-mapping of the UE with respect to the group wake-up signal configuration corresponding to the group of UEs, or causes the UE to be re-grouped into a new group wake-up signal configuration corresponding to a new group of UEs that share a new wake-up signal associated with a new discontinuous reception operation.

In an implementation of method 900, the group wake-up signal configuration includes a first group wake-up signal configuration corresponding to a first group of UEs, a first configuration of the wake-up signal, and a first configuration of the discontinuous reception operation, the at least one new wake-up parameter of the group wake-up signal configuration update message identifies a second group wake-up signal configuration corresponding to a second group of UEs, a corresponding second configuration of the wake-up signal, and corresponding a second configuration of the discontinuous reception operation, and where transmitting one or more discontinuous transmissions based on the discontinuous reception operation of the UE based on the at least one new wake-up parameter includes transmitting the second configuration of the wake-up signal corresponding to the second group of UEs.

In an implementation of method 900, the first group wake-up signal configuration identifies a first set of wake-up parameters for at least one of the first configuration of the wake-up signal or the first configuration of the discontinuous reception operation, the second group wake-up group configuration identifies a second set of wake-up parameters for at least one of the second configuration of the wake-up signal or the second configuration of the discontinuous reception operation, and the transmitting the second configuration of the wake-up signal includes transmitting according to the second set of wake-up parameters for the second wake-up signal and the second configuration of the discontinuous reception operation.

In an implementation of method 900, the second set of wake-up parameters for at least one of the second configuration of the wake-up signal or the second configuration of the discontinuous reception operation includes at least one of: one or more search space set, a control resource set, a bandwidth part, a cell, or a beam associated with the second configuration of the wake-up signal; one or more of a discontinuous reception cycle periodicity or an offset value associated with the second configuration of the discontinuous reception operation; a wake-up group identifier associated with the second configuration of the wake-up signal; a wake-up group scrambling code or radio network temporary identifier associated with the second configuration of the wake-up signal; a wake-up signal size associated with the second configuration of the wake-up signal; a wake-up information field position of a wake-up information field corresponding to the UE in the second configuration of the wake-up signal; a wake-up information field size of the wake-up information field corresponding to the UE in the second configuration of the wake-up signal; or a wake-up indicator position corresponding to the UE in the second configuration of the wake-up signal.

In an implementation of method 900, the wake-up information field corresponding to the UE in the second configuration of the wake-up signal is a new field or replaces a reserved field in the second configuration of the wake-up signal.

In an implementation of method 900, the transmitting the one or more discontinuous transmissions includes transmitting the group wake-up signal in the form of a downlink control information message having a plurality of fields including one or more of a wake-up indicator field and a corresponding wake-up information field each associated with a specific UE of the group of UEs.

In an implementation of method 900, the at least one new wake-up parameter of the group wake-up signal configuration update message identifies a new information field position of a wake-up information field corresponding to the UE in the wake-up signal, where the wake-up information field corresponding to the UE is a new field or replaces a reserved field in the wake-up signal.

In an implementation of method 900, the transmitting of the group wake-up signal configuration update message includes receiving a UE-specific message or a group-specific message.

In an implementation of method 900, the receiving of the wake-up configuration update triggering message includes receiving a UE wake-up configuration update request or a measurement report.

In an implementation of method 900, the transmitting of the group wake-up signal configuration update message includes transmitting at least one of: a wake-up control signal; one or more control signals different from the wake-up control signal and received outside of a wake-up signal occasion corresponding to the wake-up control signal; one or more control signals having a scrambling code different from the wake-up control signal and received during the wake-up signal occasion corresponding to the wake-up control signal; or a control element in a downlink payload associated with user data.

In an implementation of method 900, the transmitting of the group wake-up signal configuration update message includes transmitting a wake-up control signal having a wake-up indicator identifying that the UE does not need to wake-up, and further having a UE-specific wake-up information field having a re-mapping indicator including the at least one new wake-up parameter configured to re-map a configuration of the UE relative to the group of UEs or having a re-grouping indicator including the at least one new wake-up parameter configured to re-group the UE with a new group of UEs, the re-mapping indicator or the re-grouping indicator and the at least one new wake-up parameter define a modified group wake-up signal configuration, and the transmitting of the one or more discontinuous transmissions is further based on the modified group wake-up signal configuration.

In an implementation of method 900, the transmitting of the group wake-up signal configuration update message includes transmitting the wake-up signal having a dedicated re-mapping information field that includes re-mapping information or a dedicated re-grouping information field that includes re-grouping information, the re-mapping information or the re-grouping information define a modified group wake-up signal configuration, and the transmitting of the one or more discontinuous transmissions is further based on the modified group wake-up signal configuration.

In an implementation of method 900, the transmitting of the one or more discontinuous transmissions further includes skipping transmission of the wake-up signal in response to determining that none of the group of UEs are to be woken up to receive a data transmission.

Referring to FIG. 10, one example of an implementation of UE 104 may include a variety of components, some of which have already been described above and are described further herein, including components such as one or more processors 1312 and memory 1316 and transceiver 1302 in communication via one or more buses 1344, which may operate in conjunction with modem 1340 and/or group wake-up manager component 121 for performing dynamic group wake-up reconfiguration as described herein.

In an aspect, the one or more processors 1312 can include a modem 1340 and/or can be part of the modem 1340 that uses one or more modem processors. Thus, the various functions related to configuration component 198 may be included in modem 1340 and/or processors 1312 and, in an aspect, can be executed by a single processor, while in other aspects, different ones of the functions may be executed by a combination of two or more different processors. For example, in an aspect, the one or more processors 1312 may include any one or any combination of a modem processor, or a baseband processor, or a digital signal processor, or a transmit processor, or a receiver processor, or a transceiver processor associated with transceiver 1302. In other aspects, some of the features of the one or more processors 1312 and/or modem 1340 associated with configuration component 198 may be performed by transceiver 1302.

Also, memory 1316 may be configured to store data used herein and/or local versions of applications 1375 or communicating component 1342 and/or one or more of its subcomponents being executed by at least one processor 1312. Memory 1316 can include any type of computer-readable medium usable by a computer or at least one processor 1312, such as random access memory (RAM), read only memory (ROM), tapes, magnetic discs, optical discs, volatile memory, non-volatile memory, and any combination thereof. In an aspect, for example, memory 1316 may be a non-transitory computer-readable storage medium that stores one or more computer-executable codes defining configuration component 198 and/or one or more of its subcomponents, and/or data associated therewith, when UE 104 is operating at least one processor 1312 to execute group wake-up manager component 121 and/or one or more of its subcomponents.

Transceiver 1302 may include at least one receiver 1306 and at least one transmitter 1308. Receiver 1306 may include hardware and/or software executable by a processor for receiving data, the code including instructions and being stored in a memory (e.g., computer-readable medium). Receiver 1306 may be, for example, a radio frequency (RF) receiver. In an aspect, receiver 1306 may receive signals transmitted by at least one base station 102. Additionally, receiver 1306 may process such received signals, and also may obtain measurements of the signals, such as, but not limited to, Ec/Io, signal-to-noise ratio (SNR), reference signal received power (RSRP), received signal strength indicator (RSSI), etc. Transmitter 1308 may include hardware and/or software executable by a processor for transmitting data, the code including instructions and being stored in a memory (e.g., computer-readable medium). A suitable example of transmitter 1308 may include, but is not limited to, an RF transmitter.

Moreover, in an aspect, UE 104 may include RF front end 1388, which may operate in communication with one or more antennas 1365 and transceiver 1302 for receiving and transmitting radio transmissions, for example, wireless communications transmitted by at least one base station 102 or wireless transmissions transmitted by UE 104. The one or more antennas 1365 may include one or more antenna panels and/or sub-arrays, such as may be used for beamforming. RF front end 1388 may be connected to one or more antennas 1365 and can include one or more low-noise amplifiers (LNAs) 1390, one or more switches 1392, one or more power amplifiers (PAs) 1398, and one or more filters 1396 for transmitting and receiving RF signals.

In an aspect, LNA 1390 can amplify a received signal at a desired output level. In an aspect, each LNA 1390 may have a specified minimum and maximum gain values. In an aspect, RF front end 1388 may use one or more switches 1392 to select a particular LNA 1390 and its specified gain value based on a desired gain value for a particular application.

Further, for example, one or more PA(s) 1398 may be used by RF front end 1388 to amplify a signal for an RF output at a desired output power level. In an aspect, each PA 1398 may have specified minimum and maximum gain values. In an aspect, RF front end 1388 may use one or more switches 1392 to select a particular PA 1398 and its specified gain value based on a desired gain value for a particular application.

Also, for example, one or more filters 1396 can be used by RF front end 1388 to filter a received signal to obtain an input RF signal. Similarly, in an aspect, for example, a respective filter 1396 can be used to filter an output from a respective PA 1398 to produce an output signal for transmission. In an aspect, each filter 1396 can be connected to a specific LNA 1390 and/or PA 1398. In an aspect, RF front end 1388 can use one or more switches 1392 to select a transmit or receive path using a specified filter 1396, LNA 1390, and/or PA 1398, based on a configuration as specified by transceiver 1302 and/or processor 1312.

As such, transceiver 1302 may be configured to transmit and receive wireless signals through one or more antennas 1365 via RF front end 1388. In an aspect, transceiver may be tuned to operate at specified frequencies such that UE 104 can communicate with, for example, one or more base stations 102 or one or more cells associated with one or more base stations 102. In an aspect, for example, modem 1340 can configure transceiver 1302 to operate at a specified frequency and power level based on the UE configuration of the UE 104 and the communication protocol used by modem 1340.

In an aspect, modem 1340 can be a multiband-multimode modem, which can process digital data and communicate with transceiver 1302 such that the digital data is sent and received using transceiver 1302. In an aspect, modem 1340 can be multiband and be configured to support multiple frequency bands for a specific communications protocol. In an aspect, modem 1340 can be multimode and be configured to support multiple operating networks and communications protocols. In an aspect, modem 1340 can control one or more components of UE 104 (e.g., RF front end 1388, transceiver 1302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 1312 may correspond to one or more of the processors described in connection with the UE in FIG. 3. Similarly, the memory 1316 may correspond to the memory described in connection with the UE in FIG. 3.

Referring to FIG. 11, one example of an implementation of base station 102 may include a variety of components, some of which have already been described above, but including components such as one or more processors 1412 and memory 1416 and transceiver 1402 in communication via one or more buses 1444, which may operate in conjunction with modem 1440 and configuration component 199 for communicating sidelink capability information.

The transceiver 1402, receiver 1406, transmitter 1408, one or more processors 1412, memory 1416, applications 1475, buses 1444, RF front end 1488, LNAs 1490, switches 1492, filters 1496, PAs 1498, and one or more antennas 1465 may be the same as or similar to the corresponding components of UE 104, as described above, but configured or otherwise programmed for base station operations as opposed to UE operations.

In an aspect, the processor(s) 1412 may correspond to one or more of the processors described in connection with the base station in FIG. 3. Similarly, the memory 1416 may correspond to the memory described in connection with the base station in FIG. 3.

In the following, an overview of further examples of the present invention is provided:

1. A method of wireless communication at a user equipment (UE), comprising:

receiving a group wake-up signal configuration corresponding to a group of UEs that share a wake-up signal associated with a discontinuous reception operation, wherein the group wake-up signal configuration identifies a set of wake-up parameters for at least one of the wake-up signal or the discontinuous reception operation;

transmitting a wake-up configuration update triggering message;

receiving a group wake-up signal configuration update message including at least one new wake-up parameter; and performing the discontinuous reception operation based on the at least one new wake-up parameter.

1a. The method of example 1, wherein receiving the group wake-up signal configuration comprises receiving a Layer 1 or Layer 2 signaling.

1b. The method of example 1, wherein receiving the group wake-up signal configuration update message comprises receiving a Layer 1 or Layer 2 signaling.

2. The method of example 1, wherein the at least one new wake-up parameter comprises at least one of:

one or more of search space set, a control resource set, a bandwidth part, a cell, or a beam associated with the wake-up signal;

one or more of a discontinuous reception cycle periodicity or an offset value associated the discontinuous reception operation;

a wake-up group identifier associated with the wake-up signal;

a wake-up group scrambling code or radio network temporary identifier associated with the wake-up signal;

a wake-up signal size associated with the wake-up signal;

a wake-up information field position of a wake-up information field corresponding to the UE in the wake-up signal;

a wake-up information field size of the wake-up information field corresponding to the UE in the wake-up signal; or a wake-up indicator position corresponding to the UE in the wake-up signal.

3. The method of example 1, wherein the at least one new wake-up parameter of the group wake-up signal configuration update message causes a re-mapping of the UE with respect to the group wake-up signal configuration corresponding to the group of UEs, or causes the UE to be re-grouped into a new group wake-up signal configuration corresponding to a new group of UEs that share a new wake-up signal associated with a new discontinuous reception operation.

4. The method of example 1, wherein the group wake-up signal configuration comprises a first group wake-up signal configuration corresponding to a first group of UEs, a first configuration of the wake-up signal, and a first configuration of the discontinuous reception operation;

wherein the at least one new wake-up parameter of the group wake-up signal configuration update message identifies a second group wake-up signal configuration corresponding to a second group of UEs, a corresponding second configuration of the wake-up signal, and corresponding a second configuration of the discontinuous reception operation;

wherein performing the discontinuous reception operation comprises:

monitoring for the second configuration of the wake-up signal of the second group wake-up signal configuration corresponding to the second group of UEs.

5. The method of example 3, wherein the first group wake-up signal configuration identifies a first set of wake-up parameters for at least one of the first configuration of the wake-up signal or the first configuration of the discontinuous reception operation;

wherein the second group wake-up group configuration identifies a second set of wake-up parameters for at least one of the second configuration of the wake-up signal or the second configuration of the discontinuous reception operation; and wherein monitoring for the second configuration of the wake-up signal comprises monitoring according to the second set of wake-up parameters for at least one of the second wake-up signal or the second configuration of the discontinuous reception operation.

6. The method of example 5, wherein the second set of wake-up parameters for at least one of the second configuration of the wake-up signal or the second configuration of the discontinuous reception operation comprises at least one of:

one or more of search space set, a control resource set, a bandwidth part, a cell, or a beam associated with the second configuration of the wake-up signal;

one or more of a discontinuous reception cycle periodicity or an offset value associated with the second configuration of the discontinuous reception operation;

a wake-up group identifier associated with the second configuration of the wake-up signal;

a wake-up group scrambling code or radio network temporary identifier associated with the second configuration of the wake-up signal;

a wake-up signal size associated with the second configuration of the wake-up signal;

a wake-up information field position of a wake-up information field corresponding to the UE in the second configuration of the wake-up signal;

a wake-up information field size of the wake-up information field corresponding to the UE in the second configuration of the wake-up signal; or a wake-up indicator position corresponding to the UE in the second configuration of the wake-up signal.

7. The method of example 6, wherein the wake-up information field corresponding to the UE in the second configuration of the wake-up signal is a new field or replaces a reserved field in the second configuration of the wake-up signal.

8. The method of example 1, wherein the group wake-up signal comprises a downlink control information message having a plurality of fields including one or more of a wake-up indicator field and a corresponding wake-up information field each associated with a specific UE of the group of UEs.

9. The method of example 1, wherein the at least one new wake-up parameter of the group wake-up signal configuration update message identifies a new information field position of a wake-up information field corresponding to the UE in the wake-up signal, wherein the wake-up information field corresponding to the UE is a new field or replaces a reserved field in the wake-up signal.

10. The method of any of examples 1 to 9, wherein receiving the group wake-up signal configuration update message comprises receiving a UE-specific message or a group-specific message.

11. The method of any of examples 1 to 9, wherein transmitting the wake-up configuration update triggering message comprises transmitting a UE wake-up configuration update request.

12. The method of any of examples 1 to 9, wherein transmitting the wake-up configuration update triggering message comprises transmitting a measurement report.

13. The method of any of examples 1 to 12, wherein receiving the group wake-up signal configuration update message comprising receiving at least one of:

a wake-up control signal;

one or more control signals different from the wake-up control signal and received outside of a wake-up signal occasion corresponding to the wake-up control signal;

one or more control signals having a scrambling code different from the wake-up control signal and received during the wake-up signal occasion corresponding to the wake-up control signal; or a control element in a downlink payload associated with user data.

14. The method of example 1, further comprising:

wherein receiving the group wake-up signal configuration update message comprises receiving a wake-up control signal having a wake-up indicator identifying that the UE does not need to wake-up, and further having a UE-specific wake-up information field having a re-mapping indicator including the at least one new wake-up parameter configured to re-map a configuration of the UE relative to the group of UEs or having a re-grouping indicator including the at least one new wake-up parameter configured to re-group the UE with a new group of UEs;

modifying the set of wake-up parameters of the group wake-up signal configuration based on the re-mapping indicator or the re-grouping indicator and the at least one new wake-up parameter to define a modified group wake-up signal configuration; and wherein performing the discontinuous reception operation is further based on the modified group wake-up signal configuration.

15. The method of example 1, further comprising:

wherein receiving the group wake-up signal configuration update message comprises receiving the wake-up signal having a dedicated re-mapping information field that includes re-mapping information or a dedicated re-grouping information field that includes re-grouping information;

modifying the set of wake-up parameters of the group wake-up signal configuration based on the re-mapping information or the re-grouping information to define a modified group wake-up signal configuration; and wherein performing the discontinuous reception operation is further based on the modified group wake-up signal configuration.

16. A method of wireless communication at a base station, comprising:

transmitting, to a user equipment (UE), a group wake-up signal configuration corresponding to a group of UEs that share a wake-up signal associated with a discontinuous reception operation of the UE, wherein the group wake-up signal configuration identifies a set of wake-up parameters for at least one of the wake-up signal or the discontinuous reception operation;

receiving a wake-up configuration update triggering message;

determining at least one new wake-up parameter in response to the wake-up configuration update triggering message;

transmitting a group wake-up signal configuration update message including at least one new wake-up parameter; and transmitting one or more discontinuous transmissions based on the discontinuous reception operation of the UE based on the at least one new wake-up parameter.

16a. The method of example 16, wherein transmitting the group wake-up signal configuration comprises transmitting a Layer 1 or Layer 2 signaling.

16b. The method of example 16, wherein transmitting the group wake-up signal configuration update message comprises transmitting a Layer 1 or Layer 2 signaling.

17. The method of example 16, wherein the at least one new wake-up parameter comprises at least one of:

one or more of search space set, a control resource set, a bandwidth part, a cell, or a beam associated with the wake-up signal;

one or more of a discontinuous reception cycle periodicity or an offset value associated the discontinuous reception operation;

a wake-up group identifier associated with the wake-up signal;

a wake-up group scrambling code or radio network temporary identifier associated with the wake-up signal;

a wake-up signal size associated with the wake-up signal;

a wake-up information field position of a wake-up information field corresponding to the UE in the wake-up signal;

a wake-up information field size of the wake-up information field corresponding to the UE in the wake-up signal; or a wake-up indicator position corresponding to the UE in the wake-up signal.

18. The method of example 16, wherein the at least one new wake-up parameter of the group wake-up signal configuration update message causes a re-mapping of the UE with respect to the group wake-up signal configuration corresponding to the group of UEs, or causes the UE to be re-grouped into a new group wake-up signal configuration corresponding to a new group of UEs that share a new wake-up signal associated with a new discontinuous reception operation.

19. The method of example 16, wherein the group wake-up signal configuration comprises a first group wake-up signal configuration corresponding to a first group of UEs, a first configuration of the wake-up signal, and a first configuration of the discontinuous reception operation;

wherein the at least one new wake-up parameter of the group wake-up signal configuration update message identifies a second group wake-up signal configuration corresponding to a second group of UEs, a corresponding second configuration of the wake-up signal, and corresponding a second configuration of the discontinuous reception operation;

wherein transmitting one or more discontinuous transmissions based on the discontinuous reception operation of the UE based on the at least one new wake-up parameter comprises:

transmitting the second configuration of the wake-up signal corresponding to the second group of UEs.

20. The method of example 19, wherein the first group wake-up signal configuration identifies a first set of wake-up parameters for at least one of the first configuration of the wake-up signal or the first configuration of the discontinuous reception operation;

wherein the second group wake-up group configuration identifies a second set of wake-up parameters for at least one of the second configuration of the wake-up signal or the second configuration of the discontinuous reception operation; and wherein transmitting the second configuration of the wake-up signal comprises transmitting according to the second set of wake-up parameters for the second wake-up signal and the second configuration of the discontinuous reception operation.

21. The method of example 20, wherein the second set of wake-up parameters for at least one of the second configuration of the wake-up signal or the second configuration of the discontinuous reception operation comprises at least one of:

one or more of search space set, a control resource set, a bandwidth part, a cell, or a beam associated with the second configuration of the wake-up signal;

one or more of a discontinuous reception cycle periodicity or an offset value associated with the second configuration of the discontinuous reception operation;

a wake-up group identifier associated with the second configuration of the wake-up signal;

a wake-up group scrambling code or radio network temporary identifier associated with the second configuration of the wake-up signal;

a wake-up signal size associated with the second configuration of the wake-up signal;

a wake-up information field position of a wake-up information field corresponding to the UE in the second configuration of the wake-up signal;

a wake-up information field size of the wake-up information field corresponding to the UE in the second configuration of the wake-up signal; or a wake-up indicator position corresponding to the UE in the second configuration of the wake-up signal.

22. The method of example 21, wherein the wake-up information field corresponding to the UE in the second configuration of the wake-up signal is a new field or replaces a reserved field in the second configuration of the wake-up signal.

23. The method of example 16, wherein transmitting the one or more discontinuous transmissions comprising transmitting the group wake-up signal in the form of a downlink control information message having a plurality of fields including one or more of a wake-up indicator field and a corresponding wake-up information field each associated with a specific UE of the group of UEs.

24. The method of example 16, wherein the at least one new wake-up parameter of the group wake-up signal configuration update message identifies a new information field position of a wake-up information field corresponding to the UE in the wake-up signal, wherein the wake-up information field corresponding to the UE is a new field or replaces a reserved field in the wake-up signal.

25. The method of any of examples 16 to 24 wherein transmitting the group wake-up signal configuration update message comprises receiving a UE-specific message or a group-specific message.

26. The method of any of examples 16 to 24, wherein receiving the wake-up configuration update triggering message comprises receiving a UE wake-up configuration update request.

27. The method of any of examples 16 to 24, wherein receiving the wake-up configuration update triggering message comprises receiving a measurement report.

28. The method of any of examples 16 to 24, wherein transmitting the group wake-up signal configuration update message comprising transmitting at least one of:

a wake-up control signal;

one or more control signals different from the wake-up control signal and received outside of a wake-up signal occasion corresponding to the wake-up control signal;

one or more control signals having a scrambling code different from the wake-up control signal and received during the wake-up signal occasion corresponding to the wake-up control signal; or a control element in a downlink payload associated with user data.

29. The method of example 16, further comprising:

wherein transmitting the group wake-up signal configuration update message comprises transmitting a wake-up control signal having a wake-up indicator identifying that the UE does not need to wake-up, and further having a UE-specific wake-up information field having a re-mapping indicator including the at least one new wake-up parameter configured to re-map a configuration of the UE relative to the group of UEs or having a re-grouping indicator including the at least one new wake-up parameter configured to re-group the UE with a new group of UEs;

wherein the re-mapping indicator or the re-grouping indicator and the at least one new wake-up parameter define a modified group wake-up signal configuration; and wherein transmitting the one or more discontinuous transmissions is further based on the modified group wake-up signal configuration.

30. The method of example 16, further comprising:

wherein transmitting the group wake-up signal configuration update message comprises transmitting the wake-up signal having a dedicated re-mapping information field that includes re-mapping information or a dedicated re-grouping information field that includes re-grouping information;

wherein the re-mapping information or the re-grouping information define a modified group wake-up signal configuration; and wherein transmitting the one or more discontinuous transmissions is further based on the modified group wake-up signal configuration.

31. The method of example 16, wherein transmitting the one or more discontinuous transmissions further comprises skipping transmission of the wake-up signal in response to determining that none of the group of UEs are to be woken up to receive a data transmission.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   receiving a group wake-up signal configuration corresponding to a group of UEs that share a wake-up signal associated with a discontinuous reception operation, wherein the group wake-up signal configuration identifies a set of wake-up parameters for at least one of the wake-up signal or the discontinuous reception operation;
   transmitting a wake-up configuration update triggering message;
   receiving a group wake-up signal configuration update message including at least one new wake-up parameter; and
   performing the discontinuous reception operation based on the at least one new wake-up parameter.

2. The method of claim 1, wherein receiving the group wake-up signal configuration comprises receiving a Layer 1 or Layer 2 signaling.

3. The method of claim 1, wherein receiving the group wake-up signal configuration update message comprises receiving a Layer 1 or Layer 2 signaling.

4. The method of claim 1, wherein receiving the group wake-up signal configuration update message comprises receiving at least one of:
   a wake-up control signal;
   one or more control signals different from the wake-up control signal and received outside of a wake-up signal occasion corresponding to the wake-up control signal;
   one or more control signals having a scrambling code different from the wake-up control signal and received during the wake-up signal occasion corresponding to the wake-up control signal; or
   a control element in a downlink payload associated with user data.

5. The method of claim 1, further comprising receiving a group wake-up signal configuration corresponding to the new group of UEs, wherein the group wake-up signal configuration identifies a set of wake-up parameters for at least one of the new wake-up signal or the new discontinuous reception operation, wherein the at least one new wake-up parameter comprises at least one of:
   one or more of search space set, a control resource set, a bandwidth part, a cell, or a beam associated with the wake-up signal;
   one or more of a discontinuous reception cycle periodicity or an offset value associated the discontinuous reception operation;
   a wake-up group identifier associated with the wake-up signal;
   a wake-up group scrambling code or radio network temporary identifier associated with the wake-up signal;
   a wake-up signal size associated with the wake-up signal;
   a wake-up information field position of a wake-up information field corresponding to the UE in the wake-up signal;
   a wake-up information field size of the wake-up information field corresponding to the UE in the wake-up signal; or
   a wake-up indicator position corresponding to the UE in the wake-up signal.

6. The method of claim 1, wherein the at least one new wake-up parameter of the group wake-up signal configuration update message causes a re-mapping of the UE with respect to the group wake-up signal configuration corresponding to the group of UEs, or causes the UE to be re-grouped into a new group wake-up signal configuration corresponding to a new group of UEs that share a new wake-up signal associated with a new discontinuous reception operation.

7. The method of claim 1,
   wherein the group wake-up signal configuration comprises a first group wake-up signal configuration corresponding to a first group of UEs, a first configuration of the wake-up signal, and a first configuration of the discontinuous reception operation;
   wherein the at least one new wake-up parameter of the group wake-up signal configuration update message identifies a second group wake-up signal configuration corresponding to a second group of UEs, a corresponding second configuration of the wake-up signal, and corresponding a second configuration of the discontinuous reception operation;
   wherein performing the discontinuous reception operation comprises:
      monitoring for the second configuration of the wake-up signal of the second group wake-up signal configuration corresponding to the second group of UEs.

8. The method of claim 7,
   wherein the first group wake-up signal configuration identifies a first set of wake-up parameters for at least one of the first configuration of the wake-up signal or the first configuration of the discontinuous reception operation;
   wherein the second group wake-up group configuration identifies a second set of wake-up parameters for at least one of the second configuration of the wake-up signal or the second configuration of the discontinuous reception operation; and
   wherein monitoring for the second configuration of the wake-up signal comprises monitoring according to the second set of wake-up parameters for at least one of the second wake-up signal or the second configuration of the discontinuous reception operation.

9. The method of claim 8, wherein the second set of wake-up parameters for at least one of the second configuration of the wake-up signal or the second configuration of the discontinuous reception operation comprises at least one of:
   one or more of search space set, a control resource set, a bandwidth part, a cell, or a beam associated with the second configuration of the wake-up signal;
   one or more of a discontinuous reception cycle periodicity or an offset value associated with the second configuration of the discontinuous reception operation;
   a wake-up group identifier associated with the second configuration of the wake-up signal;

a wake-up group scrambling code or radio network temporary identifier associated with the second configuration of the wake-up signal;

a wake-up signal size associated with the second configuration of the wake-up signal;

a wake-up information field position of a wake-up information field corresponding to the UE in the second configuration of the wake-up signal;

a wake-up information field size of the wake-up information field corresponding to the UE in the second configuration of the wake-up signal; or a wake-up indicator position corresponding to the UE in the second configuration of the wake-up signal.

10. The method of claim 9, wherein the wake-up information field corresponding to the UE in the second configuration of the wake-up signal is a new field or replaces a reserved field in the second configuration of the wake-up signal.

11. The method of claim 1, wherein the group wake-up signal comprises a downlink control information message having a plurality of fields including one or more of a wake-up indicator field and a corresponding wake-up information field each associated with a specific UE of the group of UEs.

12. The method of claim 1, wherein the at least one new wake-up parameter of the group wake-up signal configuration update message identifies a new information field position of a wake-up information field corresponding to the UE in the wake-up signal, wherein the wake-up information field corresponding to the UE is a new field or replaces a reserved field in the wake-up signal.

13. The method of claim 1, wherein receiving the group wake-up signal configuration update message comprises receiving a UE-specific message or a group-specific message.

14. The method of claim 1, wherein transmitting the wake-up configuration update triggering message comprises transmitting a UE wake-up configuration update request.

15. The method of claim 1, wherein transmitting the wake-up configuration update triggering message comprises transmitting a measurement report.

16. The method of claim 1, further comprising:
wherein receiving the group wake-up signal configuration update message comprises receiving a wake-up control signal having a wake-up indicator identifying that the UE does not need to wake-up, and further having a UE-specific wake-up information field having a re-mapping indicator including the at least one new wake-up parameter configured to re-map a configuration of the UE relative to the group of UEs or having a re-grouping indicator including the at least one new wake-up parameter configured to re-group the UE with a new group of UEs;
modifying the set of wake-up parameters of the group wake-up signal configuration based on the re-mapping indicator or the re-grouping indicator and the at least one new wake-up parameter to define a modified group wake-up signal configuration; and
wherein performing the discontinuous reception operation is further based on the modified group wake-up signal configuration.

17. The method of claim 1, further comprising:
wherein receiving the group wake-up signal configuration update message comprises receiving the wake-up signal having a dedicated re-mapping information field that includes re-mapping information or a dedicated re-grouping information field that includes re-grouping information;
modifying the set of wake-up parameters of the group wake-up signal configuration based on the re-mapping information or the re-grouping information to define a modified group wake-up signal configuration; and
wherein performing the discontinuous reception operation is further based on the modified group wake-up signal configuration.

18. A method of wireless communication at a base station, comprising:
transmitting, to a user equipment (UE), a group wake-up signal configuration corresponding to a group of UEs that share a wake-up signal associated with a discontinuous reception operation of the UE, wherein the group wake-up signal configuration identifies a set of wake-up parameters for at least one of the wake-up signal or the discontinuous reception operation;
receiving a wake-up configuration update triggering message;
determining at least one new wake-up parameter in response to the wake-up configuration update triggering message;
transmitting a group wake-up signal configuration update message including at least one new wake-up parameter; and
transmitting one or more discontinuous transmissions based on the discontinuous reception operation of the UE based on the at least one new wake-up parameter.

19. The method of claim 18, wherein transmitting the group wake-up signal configuration comprises transmitting a Layer 1 or Layer 2 signaling.

20. The method of claim 18, wherein transmitting the group wake-up signal configuration update message comprises transmitting a Layer 1 or Layer 2 signaling.

21. The method of any of claim 18, wherein transmitting the group wake-up signal configuration update message comprising transmitting at least one of:
a wake-up control signal;
one or more control signals different from the wake-up control signal and received outside of a wake-up signal occasion corresponding to the wake-up control signal;
one or more control signals having a scrambling code different from the wake-up control signal and received during the wake-up signal occasion corresponding to the wake-up control signal; or
a control element in a downlink payload associated with user data.

22. The method of claim 18, wherein the at least one new wake-up parameter comprises at least one of:
one or more of search space set, a control resource set, a bandwidth part, a cell, or a beam associated with the wake-up signal;
one or more of a discontinuous reception cycle periodicity or an offset value associated the discontinuous reception operation;
a wake-up group identifier associated with the wake-up signal;
a wake-up group scrambling code or radio network temporary identifier associated with the wake-up signal;
a wake-up signal size associated with the wake-up signal;
a wake-up information field position of a wake-up information field corresponding to the UE in the wake-up signal;

a wake-up information field size of the wake-up information field corresponding to the UE in the wake-up signal; or a wake-up indicator position corresponding to the UE in the wake-up signal.

23. The method of claim 18, wherein the at least one new wake-up parameter of the group wake-up signal configuration update message causes a re-mapping of the UE with respect to the group wake-up signal configuration corresponding to the group of UEs, or causes the UE to be re-grouped into a new group wake-up signal configuration corresponding to a new group of UEs that share a new wake-up signal associated with a new discontinuous reception operation.

24. The method of claim 18,
wherein the group wake-up signal configuration comprises a first group wake-up signal configuration corresponding to a first group of UEs, a first configuration of the wake-up signal, and a first configuration of the discontinuous reception operation;
wherein the at least one new wake-up parameter of the group wake-up signal configuration update message identifies a second group wake-up signal configuration corresponding to a second group of UEs, a corresponding second configuration of the wake-up signal, and corresponding a second configuration of the discontinuous reception operation;
wherein transmitting one or more discontinuous transmissions based on the discontinuous reception operation of the UE based on the at least one new wake-up parameter comprises:
transmitting the second configuration of the wake-up signal corresponding to the second group of UEs.

25. The method of claim 24,
wherein the first group wake-up signal configuration identifies a first set of wake-up parameters for at least one of the first configuration of the wake-up signal or the first configuration of the discontinuous reception operation;
wherein the second group wake-up group configuration identifies a second set of wake-up parameters for at least one of the second configuration of the wake-up signal or the second configuration of the discontinuous reception operation; and
wherein transmitting the second configuration of the wake-up signal comprises transmitting according to the second set of wake-up parameters for the second wake-up signal and the second configuration of the discontinuous reception operation.

26. The method of claim 25, wherein the second set of wake-up parameters for at least one of the second configuration of the wake-up signal or the second configuration of the discontinuous reception operation comprises at least one of:
one or more of search space set, a control resource set, a bandwidth part, a cell, or a beam associated with the second configuration of the wake-up signal;
one or more of a discontinuous reception cycle periodicity or an offset value associated with the second configuration of the discontinuous reception operation;
a wake-up group identifier associated with the second configuration of the wake-up signal;
a wake-up group scrambling code or radio network temporary identifier associated with the second configuration of the wake-up signal;

a wake-up signal size associated with the second configuration of the wake-up signal;
a wake-up information field position of a wake-up information field corresponding to the UE in the second configuration of the wake-up signal;
a wake-up information field size of the wake-up information field corresponding to the UE in the second configuration of the wake-up signal; or
a wake-up indicator position corresponding to the UE in the second configuration of the wake-up signal.

27. The method of claim 26, wherein the wake-up information field corresponding to the UE in the second configuration of the wake-up signal is a new field or replaces a reserved field in the second configuration of the wake-up signal.

28. The method of claim 18, wherein transmitting the one or more discontinuous transmissions comprising transmitting the group wake-up signal in the form of a downlink control information message having a plurality of fields including one or more of a wake-up indicator field and a corresponding wake-up information field each associated with a specific UE of the group of UEs.

29. A user equipment (UE) for wireless communications, comprising:
a memory; and
a processor in communication with the memory and configured to:
receive a group wake-up signal configuration corresponding to a group of UEs that share a wake-up signal associated with a discontinuous reception operation, wherein the group wake-up signal configuration identifies a set of wake-up parameters for at least one of the wake-up signal or the discontinuous reception operation;
transmit a wake-up configuration update triggering message;
receive a group wake-up signal configuration update message including at least one new wake-up parameter; and
perform the discontinuous reception operation based on the at least one new wake-up parameter.

30. A base station for wireless communications, comprising:
a memory; and
a processor in communication with the memory and configured to:
transmit, to a user equipment (UE), a group wake-up signal configuration corresponding to a group of UEs that share a wake-up signal associated with a discontinuous reception operation of the UE, wherein the group wake-up signal configuration identifies a set of wake-up parameters for at least one of the wake-up signal or the discontinuous reception operation;
receive a wake-up configuration update triggering message;
determine at least one new wake-up parameter in response to the wake-up configuration update triggering message;
transmit a group wake-up signal configuration update message including at least one new wake-up parameter; and
transmit one or more discontinuous transmissions based on the discontinuous reception operation of the UE based on the at least one new wake-up parameter.

* * * * *